United States Patent
Nanba

[19]

[11] Patent Number: 6,104,547
[45] Date of Patent: Aug. 15, 2000

[54] ZOOM LENS AND OPTICAL APPARATUS HAVING THE SAME

[75] Inventor: Norihiro Nanba, Kawasaki, Japan

[73] Assignee: Canon Kabushiki Kaisha, Tokyo, Japan

[21] Appl. No.: 09/054,421

[22] Filed: Apr. 3, 1998

[30] Foreign Application Priority Data

Apr. 9, 1997 [JP] Japan .................................... 9-090702

[51] Int. Cl.$^7$ .................................................. G02C 15/14
[52] U.S. Cl. ........................................... 359/687; 359/676
[58] Field of Search .................................... 359/687, 676, 359/683

[56] References Cited

U.S. PATENT DOCUMENTS

| | | |
|---|---|---|
| 4,859,042 | 8/1989 | Tanaka . |
| 5,147,826 | 9/1992 | Liu et al. ................................ 437/233 |
| 5,219,786 | 6/1993 | Noguchi .................................... 437/174 |
| 5,275,851 | 1/1994 | Fonash et al. .......................... 427/578 |
| 5,366,926 | 11/1994 | Mei .......................................... 437/173 |
| 5,403,772 | 4/1995 | Zhang et al. . |
| 5,426,064 | 6/1995 | Zhang et al. . |
| 5,481,121 | 1/1996 | Zhang et al. . |
| 5,488,000 | 1/1996 | Zhang et al. . |
| 5,492,843 | 2/1996 | Adachi et al. . |
| 5,501,989 | 3/1996 | Takayama et al. . |
| 5,508,533 | 4/1996 | Takemura . |
| 5,529,937 | 6/1996 | Zhang et al. . |
| 5,534,716 | 7/1996 | Takemura . |
| 5,543,352 | 8/1996 | Ohtani et al. . |
| 5,550,070 | 8/1996 | Funai ....................................... 437/41 |
| 5,563,426 | 10/1996 | Zhang et al. . |
| 5,569,610 | 10/1996 | Zhang et al. . |
| 5,569,936 | 10/1996 | Zhang et al. . |
| 5,580,792 | 12/1996 | Zhang et al. . |
| 5,585,291 | 12/1996 | Ohtani et al. . |
| 5,589,694 | 12/1996 | Takayama et al. . |
| 5,595,923 | 1/1997 | Zhang et al. . |
| 5,595,944 | 1/1997 | Zhang et al. . |
| 5,604,360 | 2/1997 | Zhang et al. . |
| 5,605,846 | 2/1997 | Ohtani et al. . |
| 5,606,179 | 2/1997 | Yamazaki et al. . |
| 5,608,232 | 3/1997 | Yamazaki et al. . |
| 5,612,250 | 3/1997 | Ohtani et al. . |
| 5,614,426 | 3/1997 | Funada et al. . |
| 5,614,733 | 3/1997 | Zhang et al. . |
| 5,616,506 | 4/1997 | Takemura . |
| 5,620,910 | 4/1997 | Teramoto . |
| 5,621,224 | 4/1997 | Yamazaki et al. . |
| 5,624,851 | 4/1997 | Takayama et al. . |
| 5,637,515 | 6/1997 | Takemura . |

(List continued on next page.)

FOREIGN PATENT DOCUMENTS

| | | |
|---|---|---|
| 62-24213 | 2/1987 | Japan . |
| 62-206516 | 9/1987 | Japan . |
| 62-215225 | 9/1987 | Japan . |
| 63-123009 | 5/1988 | Japan . |
| 64-68709 | 3/1989 | Japan . |
| 2-12118 | 1/1990 | Japan . |

OTHER PUBLICATIONS

R. Kakkad et al., "Crystallized Si films by low–temperature rapis thermal annealing of amorphous silicon," J. Appl. Phys., vol. 65, No. 5, Mar. 1, 1989, pp. 2069–2072.

(List continued on next page.)

Primary Examiner—Scott J. Sugarman
Attorney, Agent, or Firm—Fitzpatrick, Cella, Harper & Scinto

[57] ABSTRACT

A zoom lens includes, in order from an object side to an image side, a first lens unit of positive refractive power, a second lens unit of negative refractive power, a third lens unit of positive refractive power, the third lens being composed of a single lens, and a fourth lens unit of positive refractive power, the fourth lens unit being composed of not less than four lenses including at least one negative lens, wherein, during zooming, the first lens unit and the third lens unit are stationary and the second lens unit and the fourth lens unit move along an optical axis.

13 Claims, 14 Drawing Sheets

U.S. PATENT DOCUMENTS

| | | |
|---|---|---|
| 5,639,698 | 6/1997 | Yamazaki et al. . |
| 5,643,826 | 7/1997 | Ohtani et al. . |
| 5,646,424 | 7/1997 | Zhang et al. . |
| 5,654,203 | 8/1997 | Ohtani et al. . |
| 5,656,825 | 8/1997 | Kusumoto et al. . |
| 5,663,077 | 9/1997 | Adachi et al. . |
| 5,700,333 | 12/1997 | Yamazaki et al. . |

OTHER PUBLICATIONS

G. Liu et al., "Polycrystalline silicon thin film transistors on Corning 7059 glass substrates using short time, low–temperature processing," Appl. Phys. Lett., vol. 62, No. 20, May 17, 1993, pp. 2554–2556.

G. Liu et al., "Selective area crystallization of amorphous silicon films by low–temperature rapid thermal annealing," Appl. Phys. Lett., vol. 55, No. 7, Aug. 14, 1989, pp. 660–662.

R. Kakkad et al., "Low Temperature Selective Crystallization of Amorphous Silicon," Journal of Non–Crystalline Solids, vol. 115, 1989, pp. 66–68.

C. Hayzelden et al., "In Situ Transmission Electron Microscopy Studies of Silicide–Mediated Crystallization of Amorphous Silicon", (3 pages).

A.V. Dvurechenskii et al., "Transport Phenomena in AMorphous Silicon Doped by Ion Implanation of 3d Metals", Akademikian Lavrentev Prospekt 13, 630090 Novosibirsk 90, USSR, pp. 635–640.

T. Hempel et al., "Needle–Like Crsyatllization of Ni Doped Amorphous Silicon Thin Films", Solid State Communications, vol. 85, No. 11, pp. 921–924, 1993.

K. Kugiyama et al., "CW Laser Annealing of Polycrystalline Silicon on SiO2 and effects of Successive Furnace Annealing", J.J. Appl. Phys., vol. 21, No. 1, Jan. 1982.

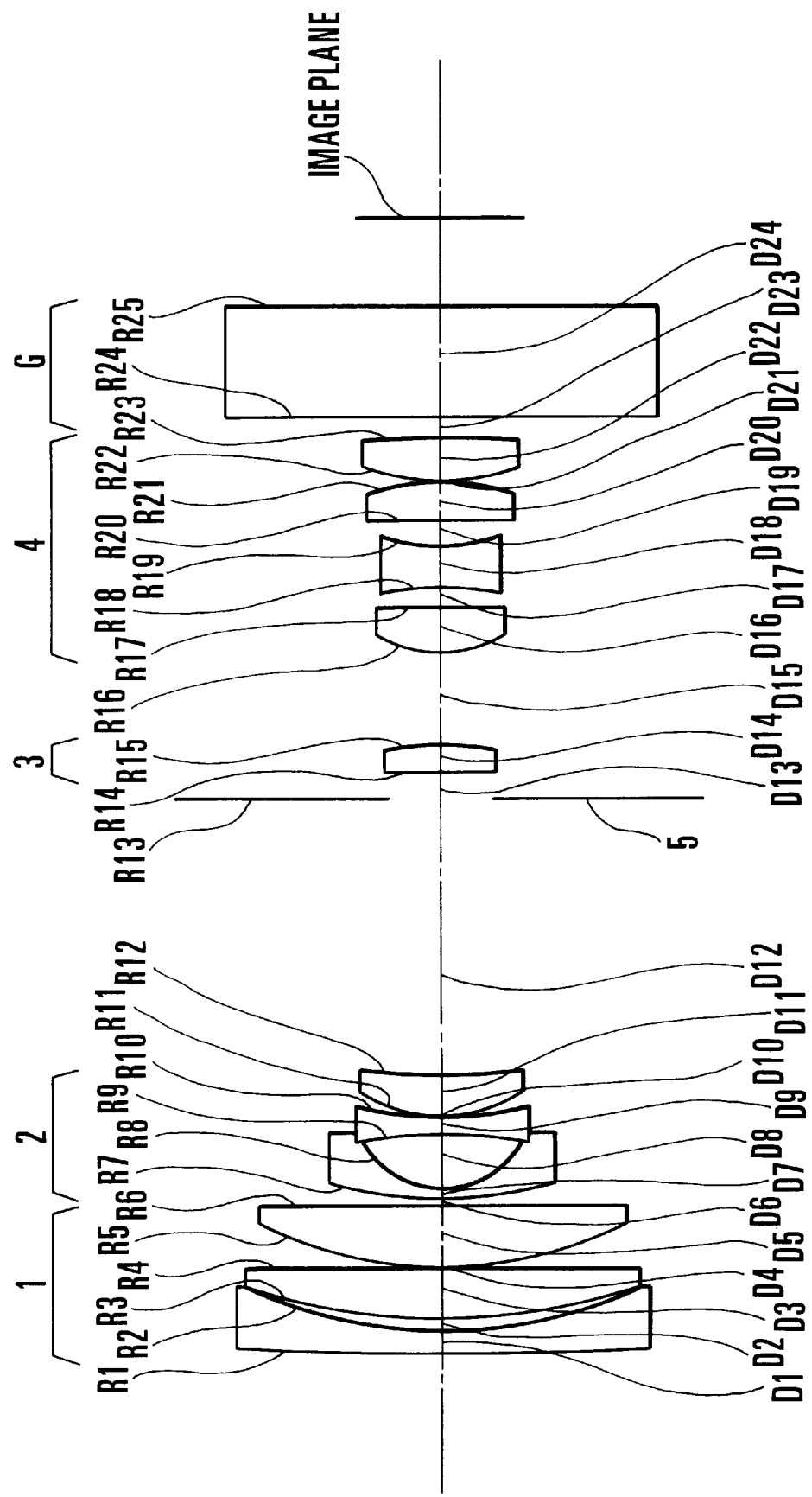
F I G. 3

FIG. 8A1
FNO/2.5

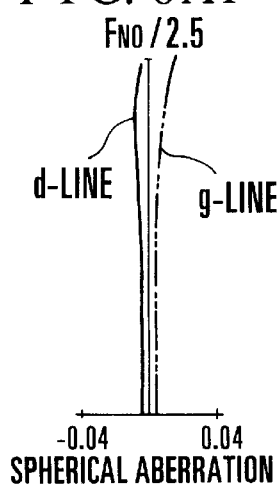
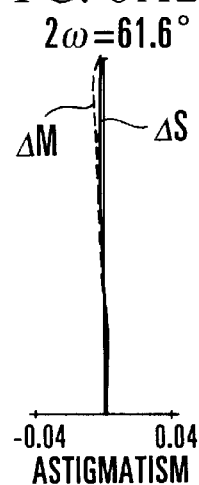
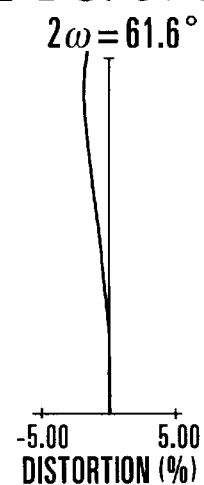
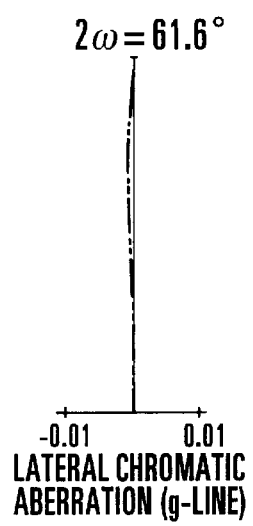

SPHERICAL ABERRATION | ASTIGMATISM | DISTORTION (%) | LATERAL CHROMATIC ABERRATION (g-LINE)

FIG. 8B1
FNO/2.55

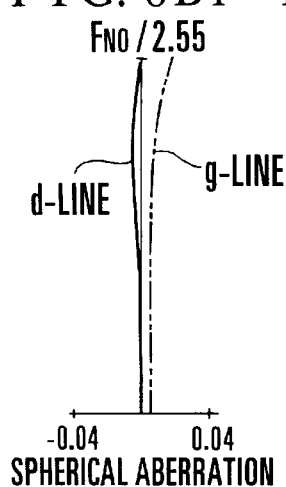
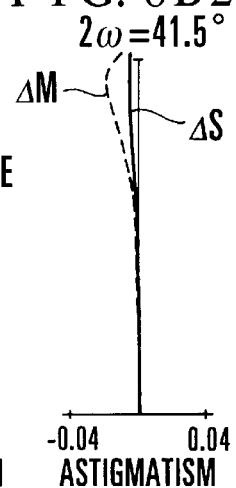
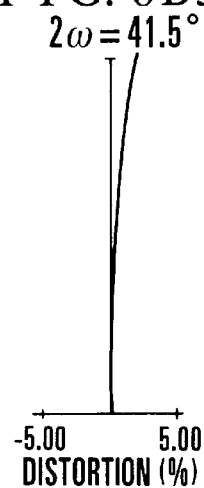
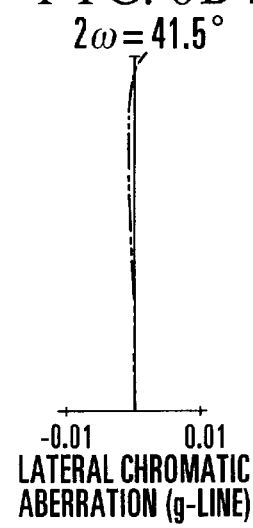

SPHERICAL ABERRATION | ASTIGMATISM | DISTORTION (%) | LATERAL CHROMATIC ABERRATION (g-LINE)

FIG. 8C1
FNO/2.64

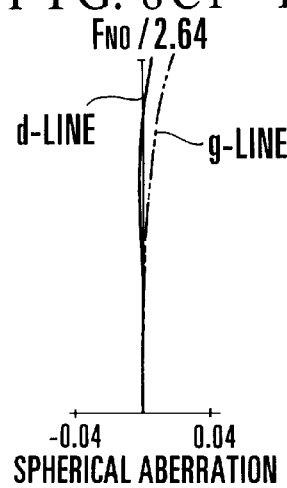
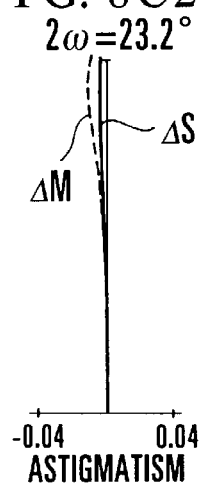
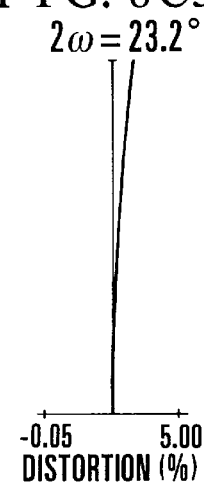
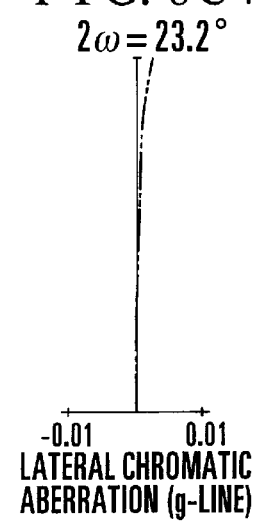

SPHERICAL ABERRATION | ASTIGMATISM | DISTORTION (%) | LATERAL CHROMATIC ABERRATION (g-LINE)

FIG. 9A1
FNO/2.50
d-LINE, g-LINE
-0.04  0.04
SPHERICAL ABERRATION

FIG. 9A2
2ω=65.2°
ΔM, ΔS
-0.04  0.04
ASTIGMATISM

FIG. 9A3
2ω=65.2°
-5.00  5.00
DISTORTION (%)

FIG. 9A4
2ω=65.2°
-0.01  0.01
LATERAL CHROMATIC ABERRATION (g-LINE)

FIG. 9B1
FNO/2.58
d-LINE, g-LINE
-0.04  0.04
SPHERICAL ABERRATION

FIG. 9B2
2ω=43.9°
ΔM, ΔS
-0.04  0.04
ASTIGMATISM

FIG. 9B3
2ω=43.9°
-5.00  5.00
DISTORTION (%)

FIG. 9B4
2ω=43.9°
-0.01  0.01
LATERAL CHROMATIC ABERRATION (g-LINE)

FIG. 9C1
FNO/2.76
d-LINE, g-LINE
-0.04  0.04
SPHERICAL ABERRATION

FIG. 9C2
2ω=24.1°
ΔS, ΔM
-0.04  0.04
ASTIGMATISM

FIG. 9C3
2ω=24.1°
-0.05  5.00
DISTORTION (%)

FIG. 9C4
2ω=24.1°
-0.01  0.01
LATERAL CHROMATIC ABERRATION (g-LINE)

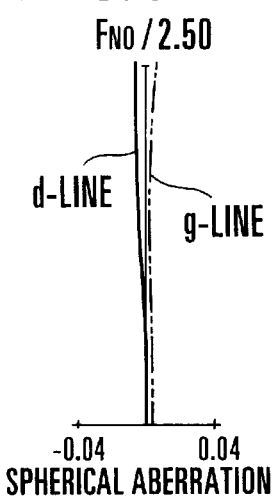
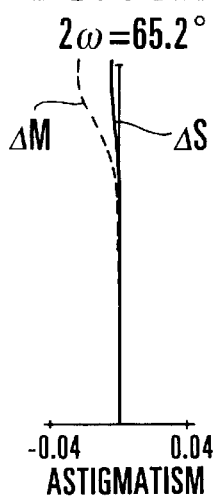
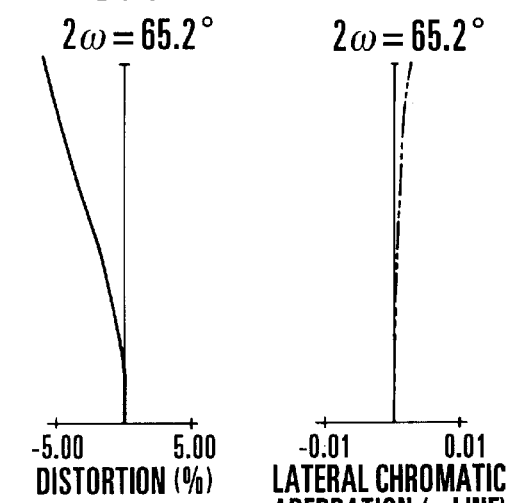
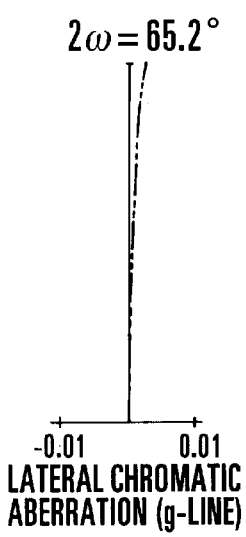
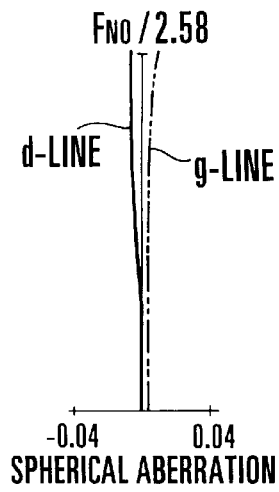
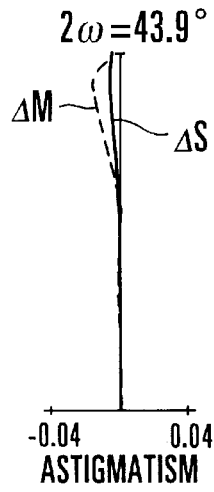
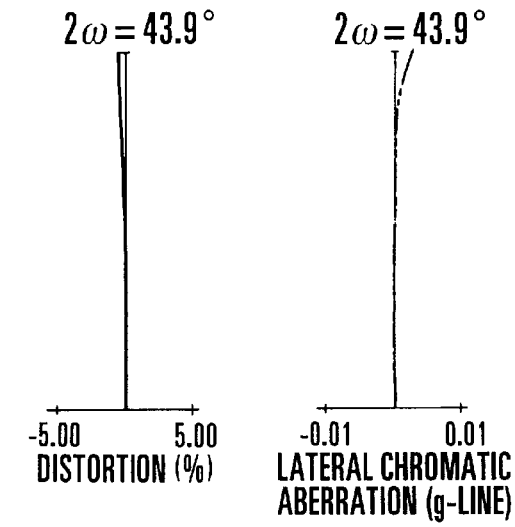
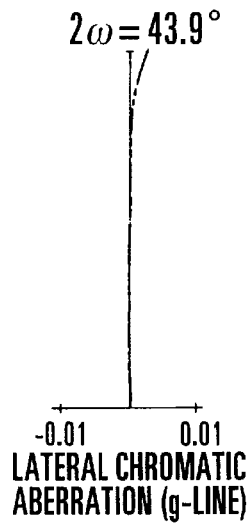
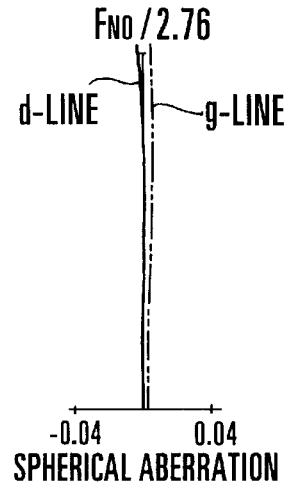
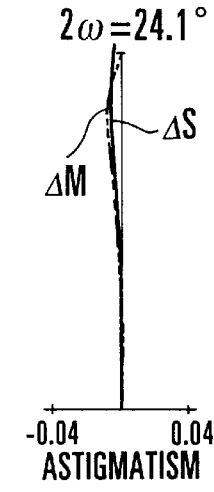
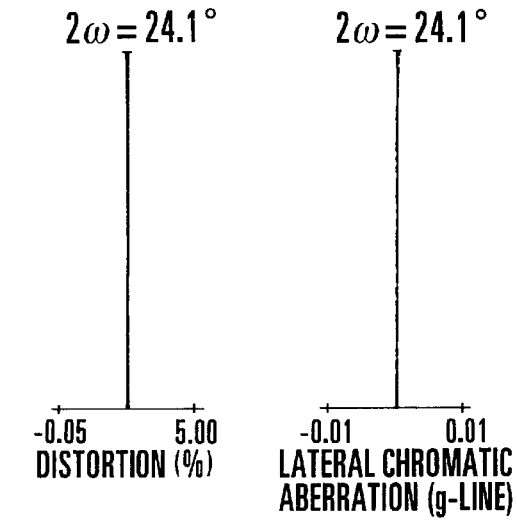
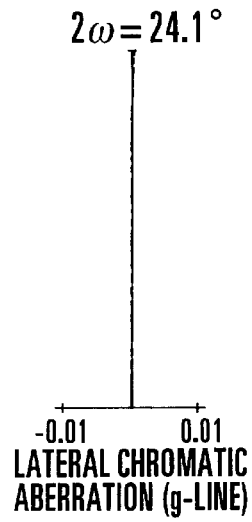

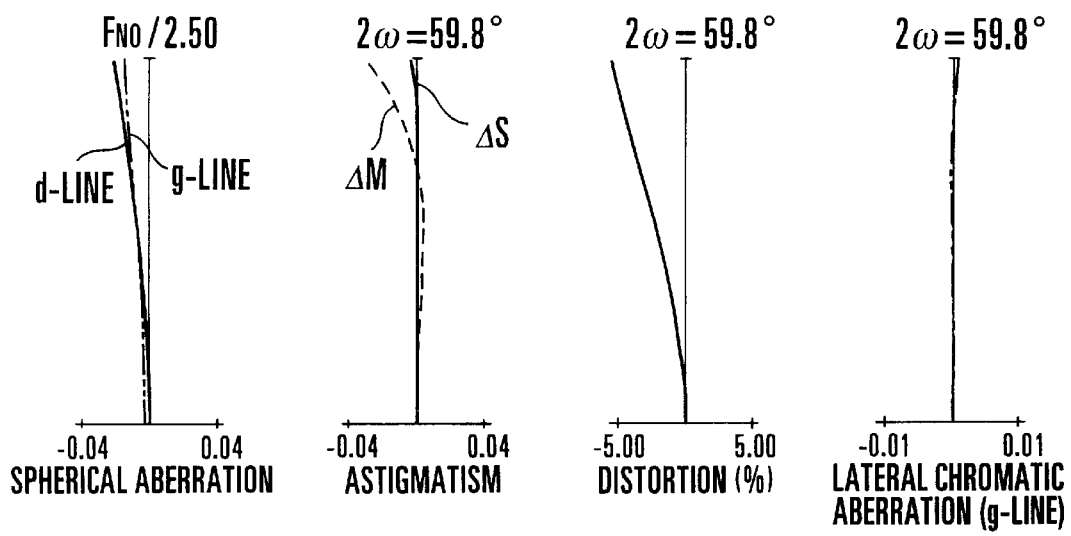
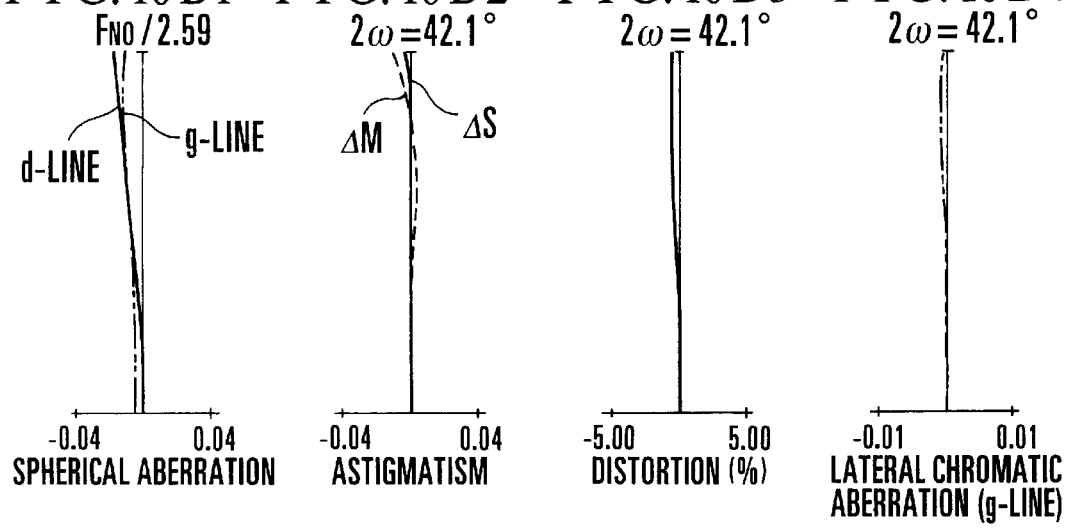
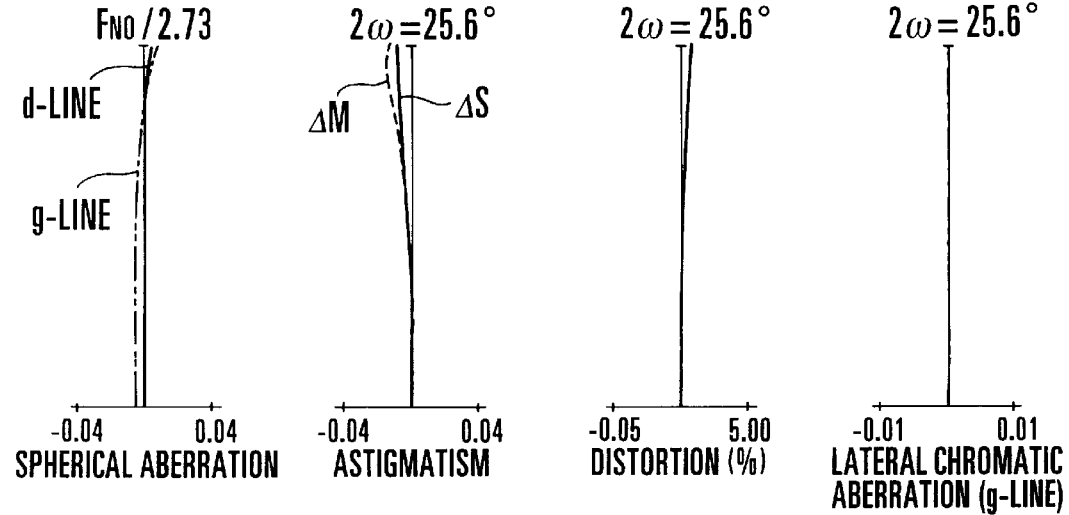

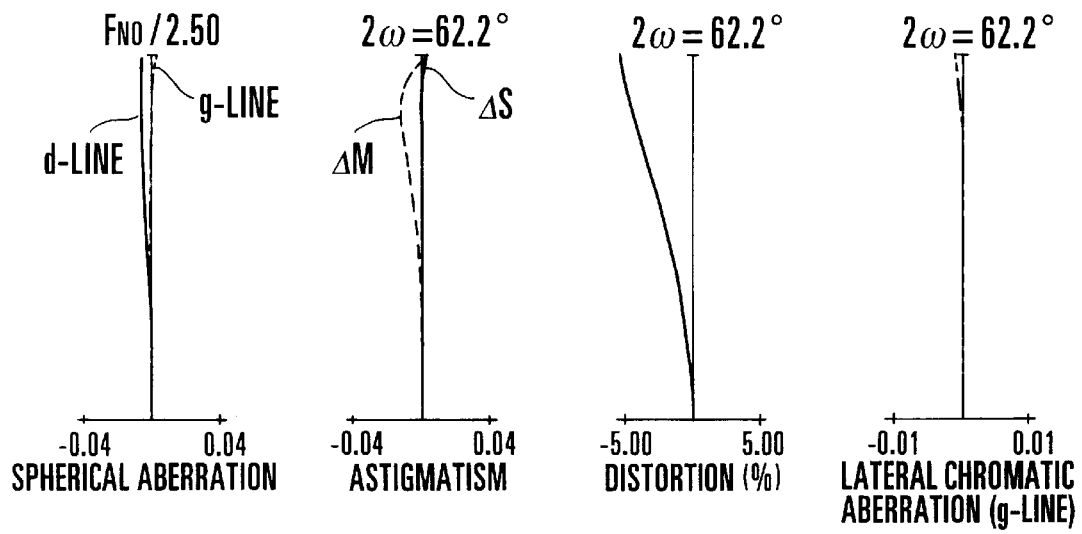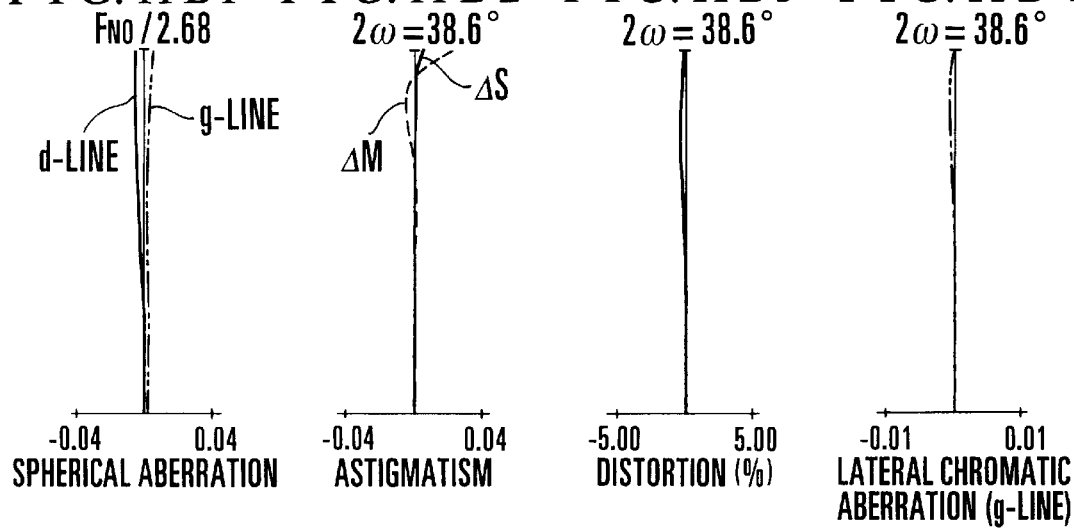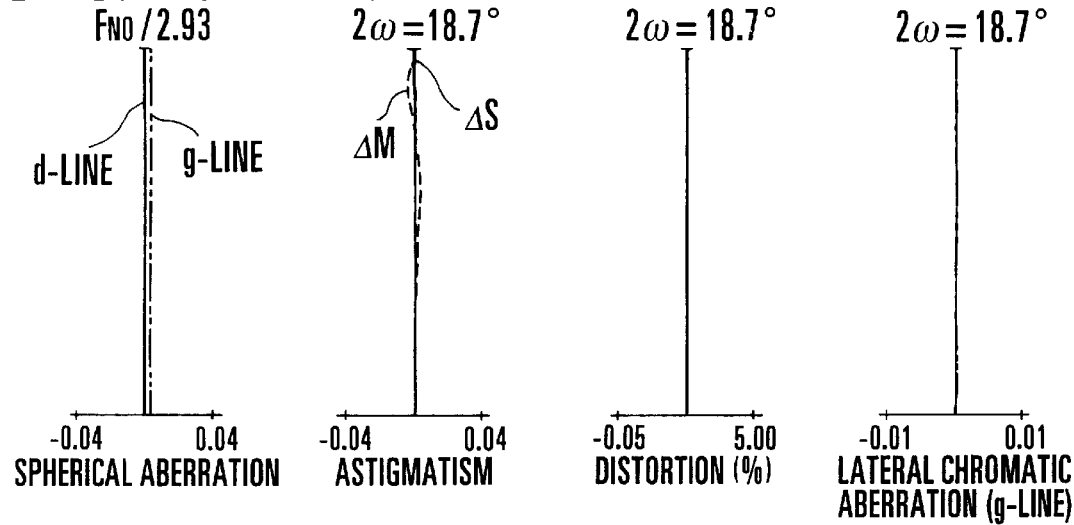

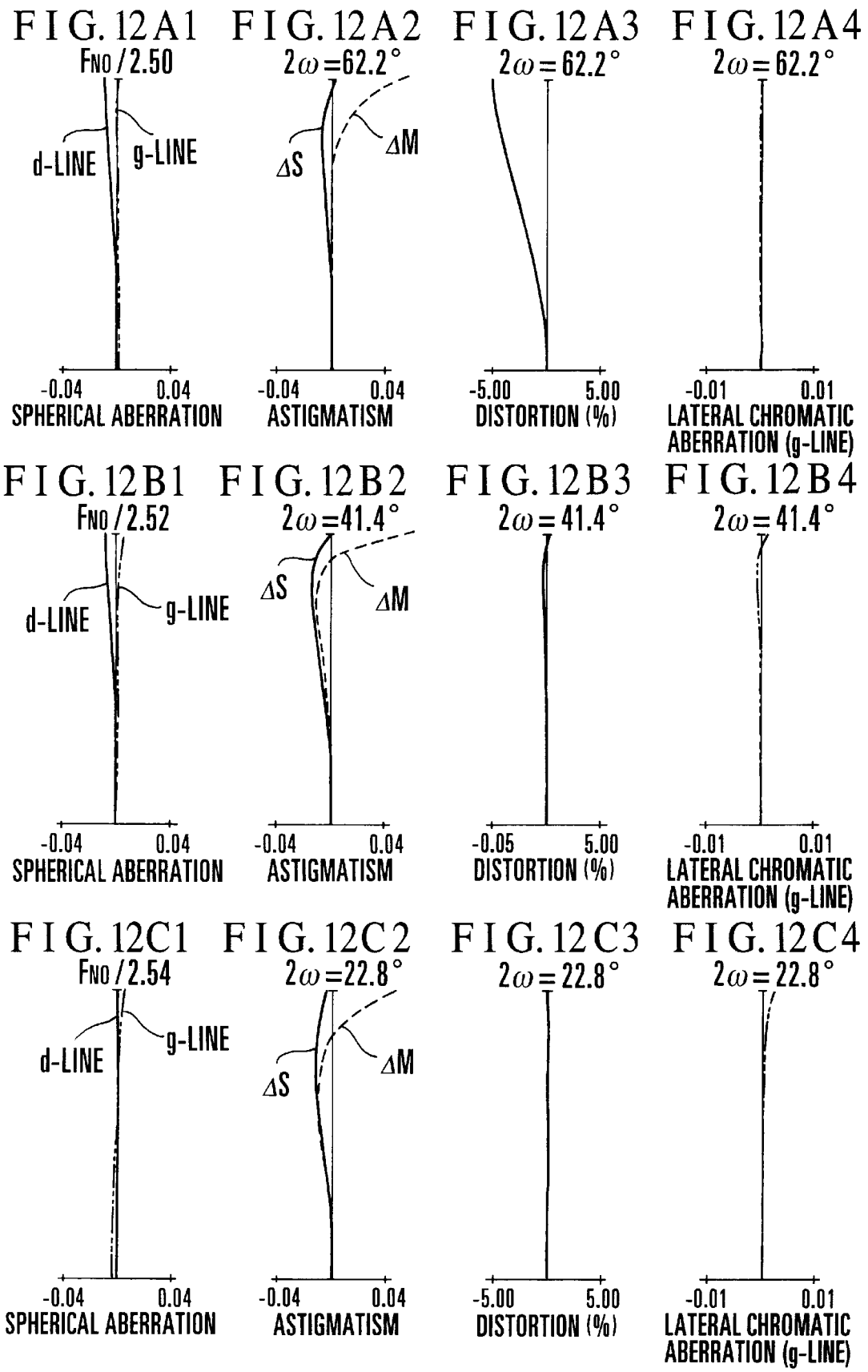

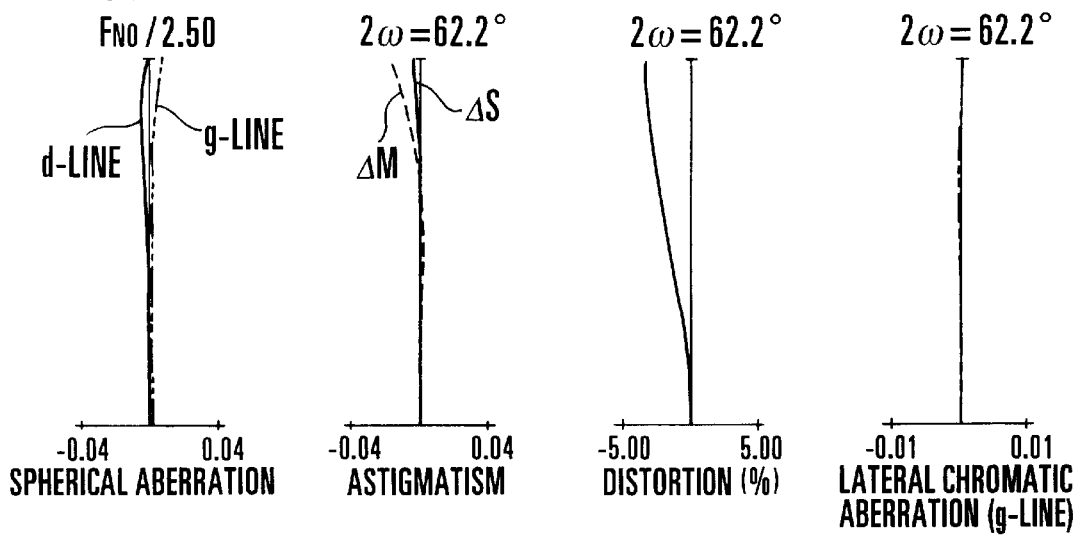
FIG.13A1 FNo/2.50
FIG.13A2 2ω=62.2°
FIG.13A3 2ω=62.2°
FIG.13A4 2ω=62.2°
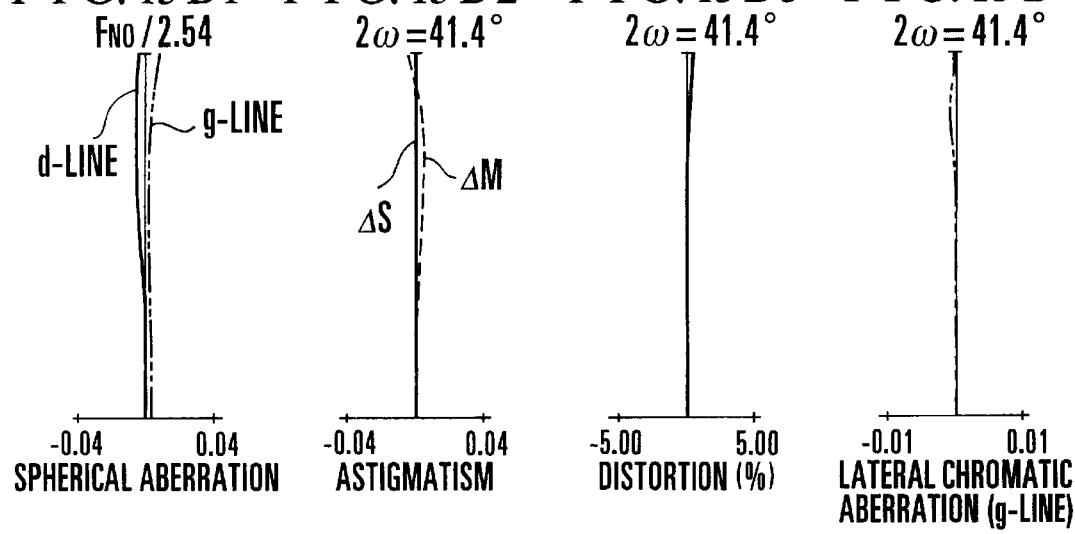
FIG.13B1 FNo/2.54
FIG.13B2 2ω=41.4°
FIG.13B3 2ω=41.4°
FIG.13B4 2ω=41.4°
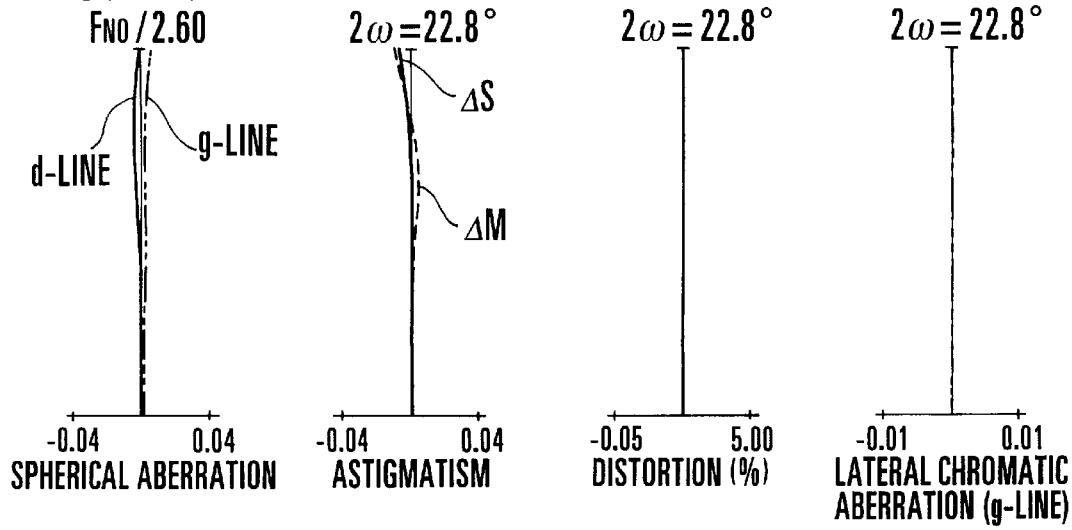
FIG.13C1 FNo/2.60
FIG.13C2 2ω=22.8°
FIG.13C3 2ω=22.8°
FIG.13C4 2ω=22.8°

ZOOM LENS AND OPTICAL APPARATUS HAVING THE SAME

BACKGROUND OF THE INVENTION

1. Field of the Invention

The present invention relates to zoom lenses for use in still video cameras, video cameras, broadcasting cameras, or photographic cameras and, more particularly, to zoom lenses whose zoom ratio is, for example 3, whose F-number is 2.5 and whose maximum angle of field is increased to 60° or wider, while still keeping high resolution.

2. Description of Related Art

The conventional zoom lenses for use in electronic cameras, video cameras, etc., are, in most cases, of the 4-unit type comprising, in order from the object side, a first lens unit of positive refractive power, a second lens unit of negative refractive power, a third lens unit of positive refractive power and a fourth lens unit of positive refractive power, the second and fourth lens units being moved to effect zooming.

This allows the first lens unit of large diameter to remain stationary. With the use of the lens units of relatively small diameters as the zoom section, therefore, a merit is produced that, when moving the variator, an electrically operated actuator to be used may be weak in driving torque. Also, if the fourth lens unit is made to serve as the focusing lens, there is another merit that one more actuator solely for focusing is not only unnecessary to use, but the minimum object distance can be shortened from that for the zoom lens whose first lens unit functions as the focusing lens without having to much increase the optically effective diameter of the first lens unit.

Such a zoom configuration is disclosed in, for example, Japanese Laid-Open Patent Applications No. Sho 62-24213, No. Sho 62-206516, No. Sho 62-215225, No. Sho 63-123009, No. Sho 64-68709, No. Hei 2-12118, etc.

The optical systems for the video camera may generally be said to have their required resolution at an upper limit, depending on the standards for television signals of NTSC, PAL or other systems, or the standards of the method of recording video signals.

For the electronic camera (e.g. digital camera) to be used as an image input device for the personal computer, however, there is no standard on which to determine such an upper limit. To such a digital camera, for the reasons mainly on the cost, it has been in many cases to apply the solid-state image pickup element that is used for the video camera. As the handling of images on the computer becomes an ever more common practice, there is a growing demand for employing a solid-state image pickup element having many more pixels. Particularly, as the degree of fineness of the output devices such as a monitor or printer improves and the speed of communication between the devices improves, the required resolution for the digital camera serving as an input device becomes ever higher.

On the contrary, most of the optical systems disclosed in the above-mentioned publications are of the form that only assures a resolution on the order of that for the conventional video camera. So, the form is not adequately suited to the zoom lens for the high resolution digital camera.

BRIEF SUMMARY OF THE INVENTION

It is a general object of the invention to provide a zoom lens which is higher in resolution than the prior known zoom lenses and has a good optical performance throughout the entire zooming range, while still maintaining a wide field angle with the bulk and size in compact form.

To attain the above object, in accordance with an aspect of the invention, there is provided a zoom lens which comprises, in order from an object side to an image side, a first lens unit of positive refractive power, a second lens unit of negative refractive power, a third lens unit of positive refractive power, the third lens being composed of a single lens, and a fourth lens unit of positive refractive power, the fourth lens unit being composed of not less than four lenses including at least one negative lens, wherein, during zooming, the first lens unit and the third lens unit are stationary and the second lens unit and the fourth lens unit move along an optical axis.

The zoom lens according to the invention is suited to be used in the digital camera or a like optical apparatus which is required to have a high resolution.

This and other objects and features of the invention will become apparent from the following detailed description of preferred embodiments thereof with reference to the accompanying drawings.

BRIEF DESCRIPTION OF THE SEVERAL VIEWS OF THE DRAWING

FIG. 3 is a longitudinal section view of a numerical example 2 of the zoom lens.

FIGS. 8A1 to 8A4, 8B1 to 8B4 and 8C1 to 8C4 are graphic representations of the various aberrations of the zoom lens of the numerical example 1.

FIGS. 9A1 to 9A4, 9B1 to 9B4 and 9C1 to 9C4 are graphic representations of the various aberrations of the zoom lens of the numerical example 2.

FIGS. 10A1 to 10A4, 10B1 to 10B4 and 10C1 to 10C4 are graphic representations of the various aberrations of the zoom lens of the numerical example 3.

FIGS. 11A1 to 11A4, 11B1 to 11B4 and 11C1 to 11C4 are graphic representations of the various aberrations of the zoom lens of the numerical example 4.

FIGS. 12A1 to 12A4, 12B1 to 12B4 and 12C1 to 12C4 are graphic representations of the various aberrations of the zoom lens of the numerical example 5.

FIGS. 13A1 to 13A4, 13B1 to 13B4 and 13C1 to 13C4 are graphic representations of the various aberrations of the zoom lens of the numerical example 6.

DETAILED DESCRIPTION OF THE INVENTION

Hereinafter, preferred embodiments of the invention will be described in detail with reference to the drawings.

Figure 1:
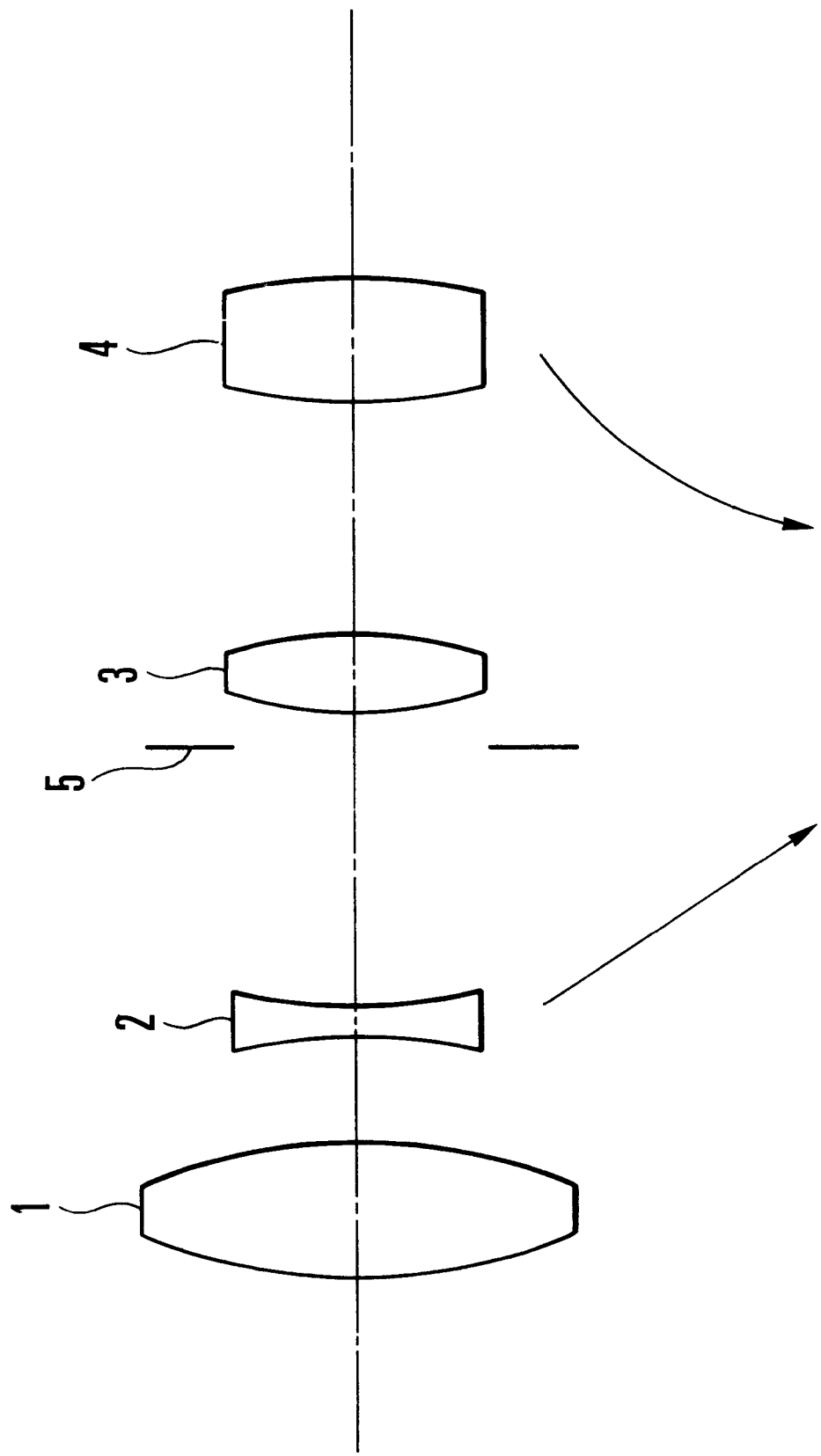
FIG. 1 is a schematic diagram showing the basic configuration of a zoom lens according to the invention.
Figure 2:
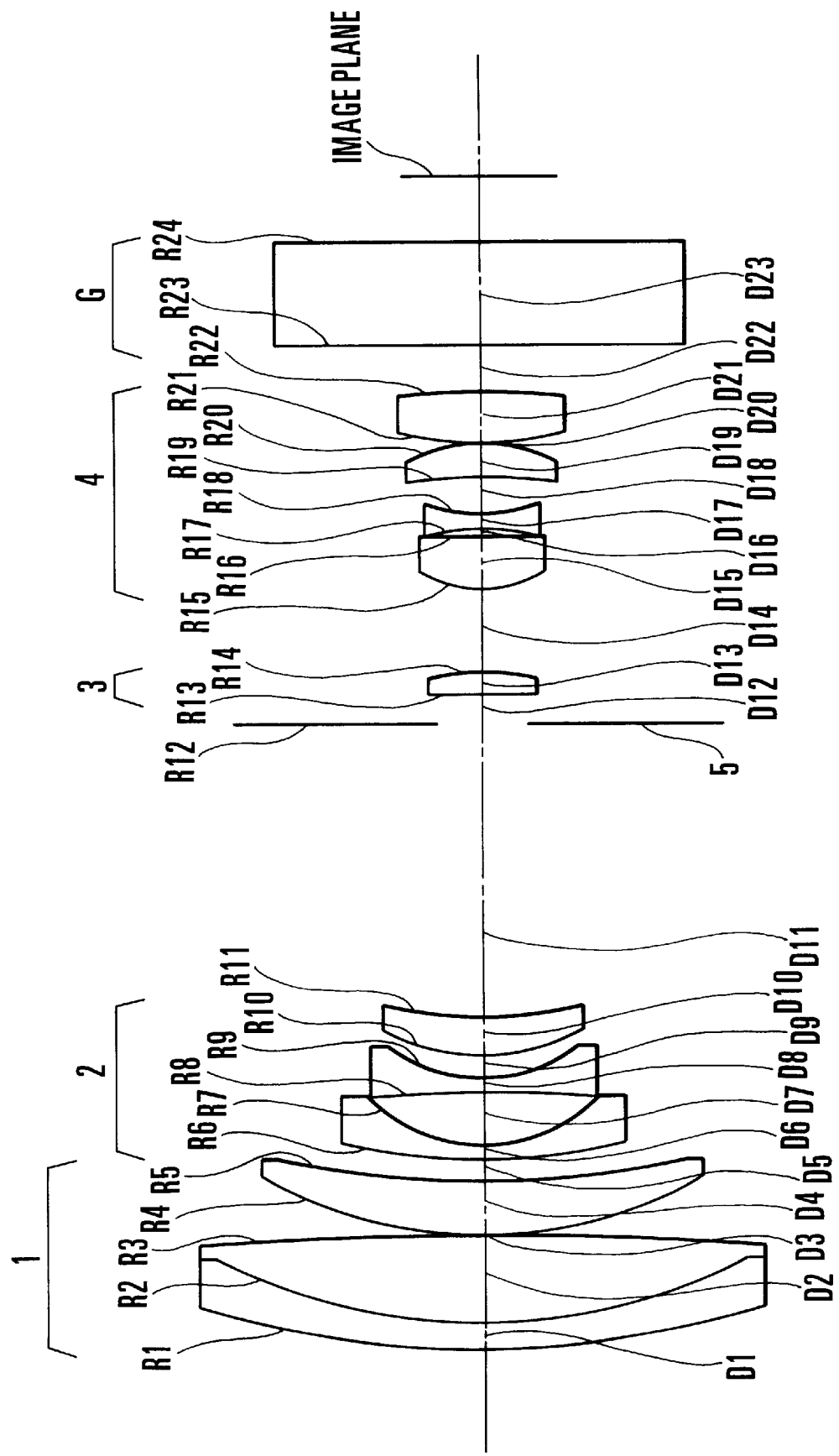
FIG. 2 is a longitudinal section view of a numerical example 1 of the zoom lens.
Figure 4:
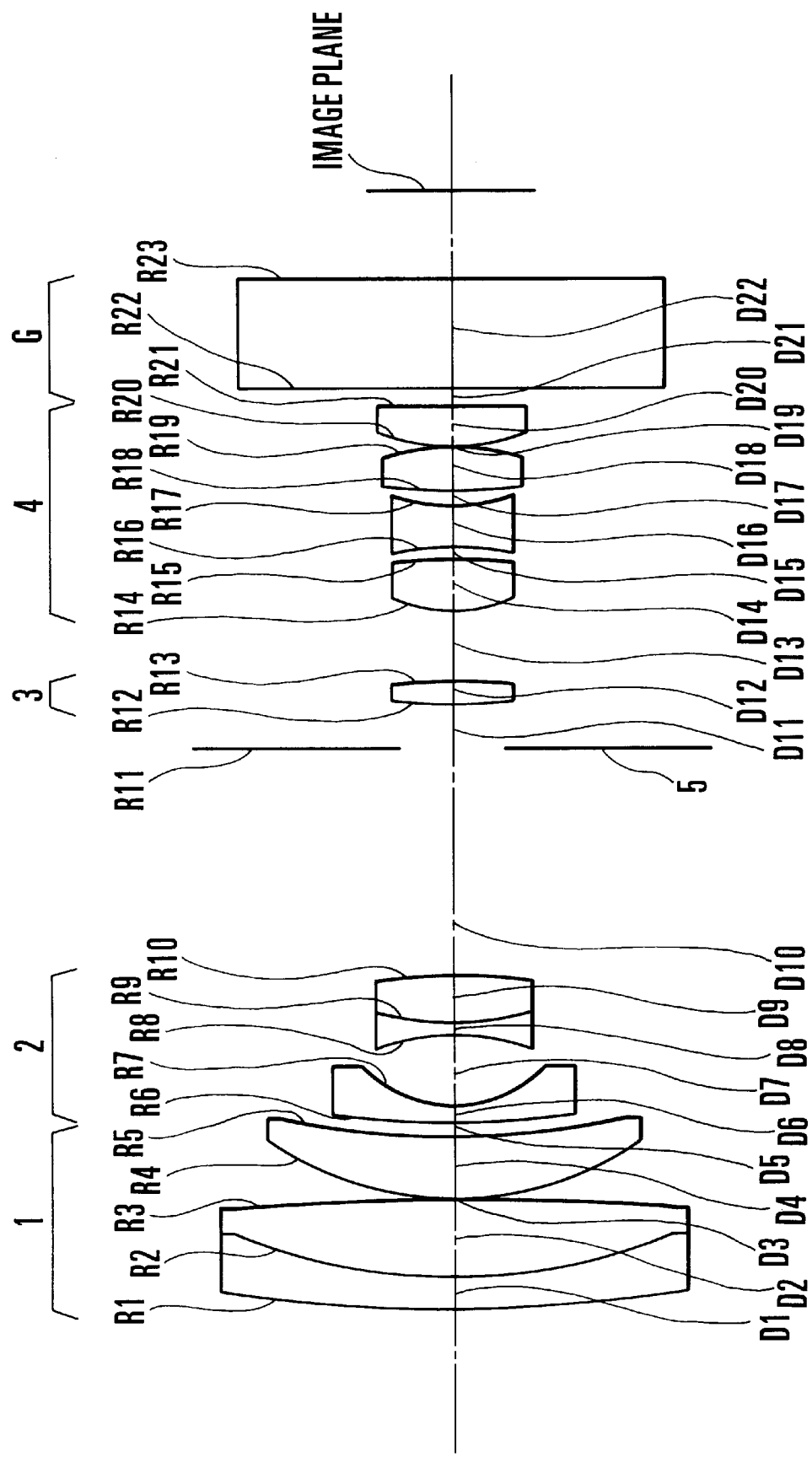
FIG. 4 is a longitudinal section view of a numerical example 3 of the zoom lens.
Figure 5:
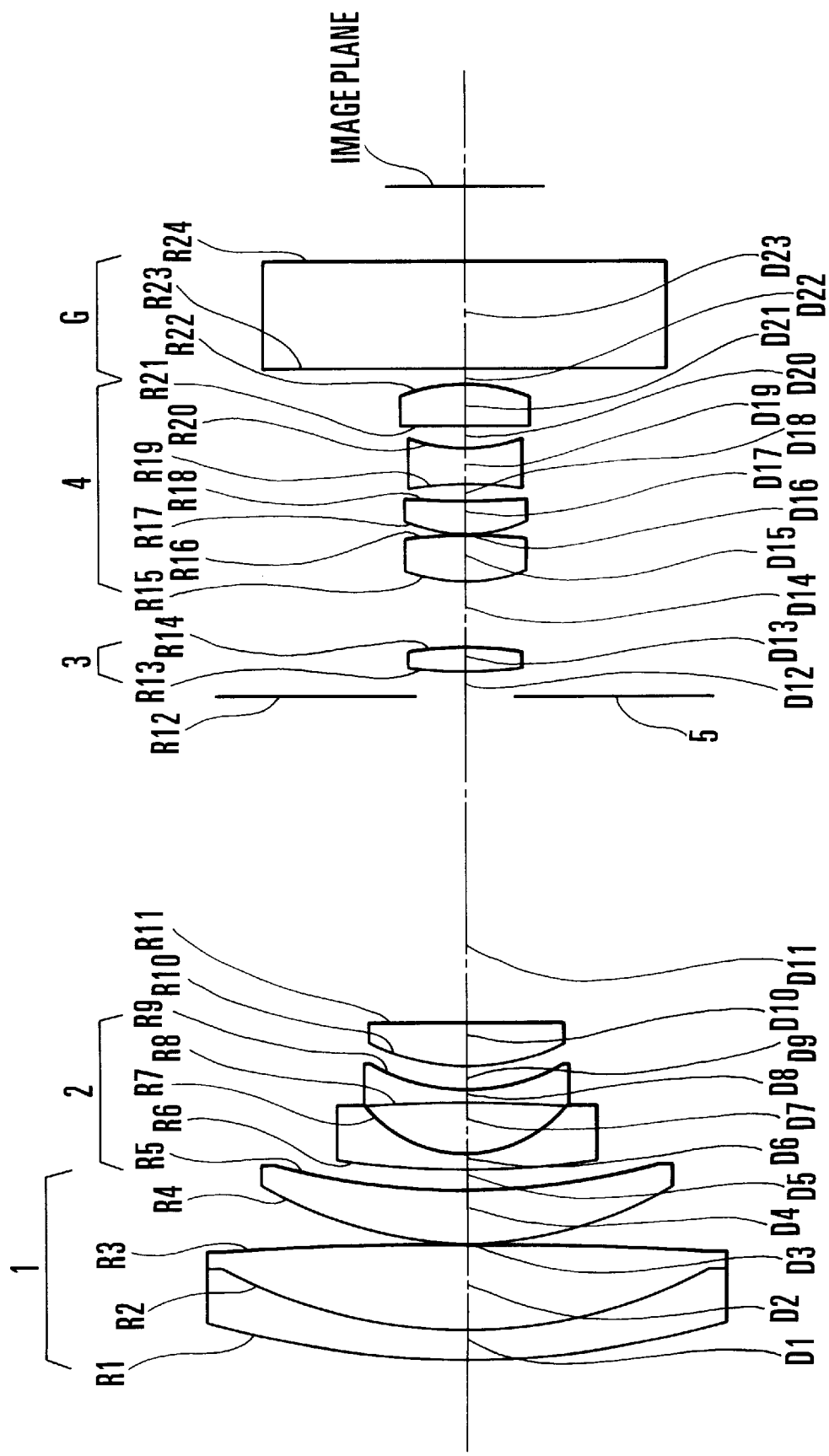
FIG. 5 is a longitudinal section view of a numerical example 4 of the zoom lens.
Figure 6:
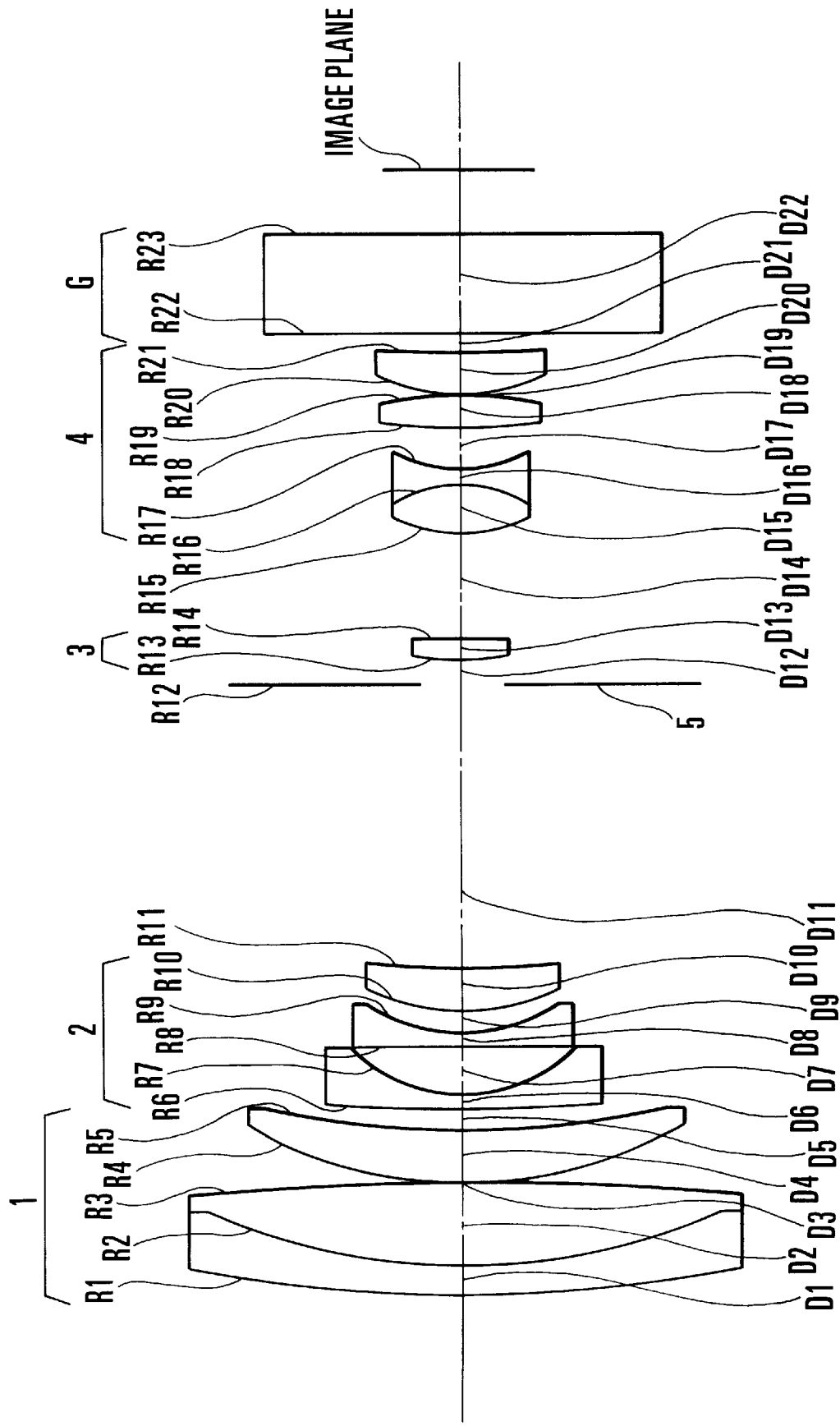
FIG. 6 is a longitudinal section view of a numerical example 5 of the zoom lens.
Figure 7:
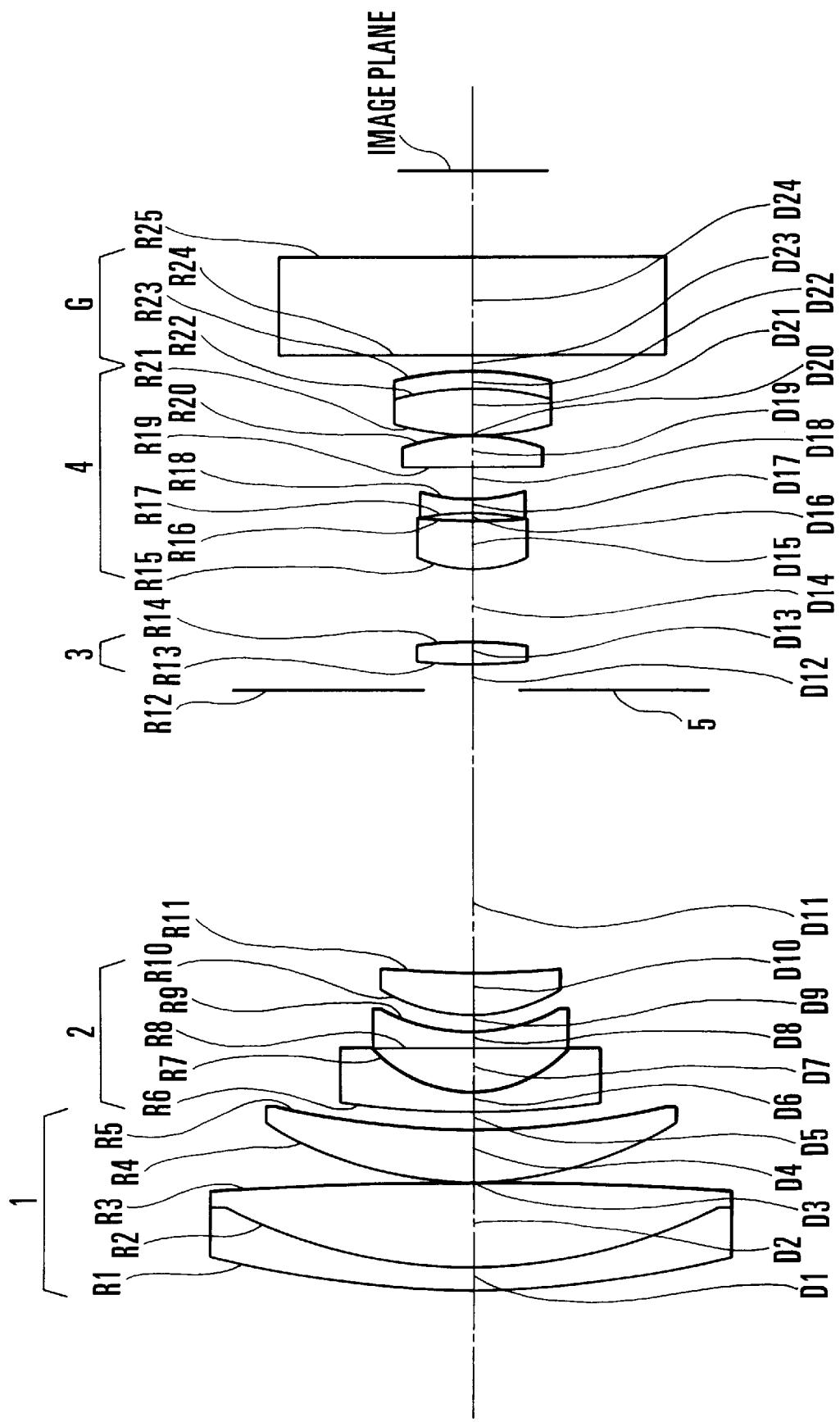
FIG. 7 is a longitudinal section view of a numerical example 6 of the zoom lens.

FIG. 1 in schematic diagram shows the basic configuration of a zoom lens according to the invention. FIG. 2 to FIG. 7 in block diagrams show the six zoom lenses in the wide-angle position, which correspond respectively to the numerical examples 1 to 6 of the invention, which will be more fully described later. In FIGS. 2 to 7, an optical member G in the rearmost position is a glass block equivalent to an infrared cut filter or optical low-pass filter.

FIGS. 8A1 to 8A4, 8B1 to 8B4 and 8C1 to 8C4 through FIGS. 13A1 to 13A4, 13B1 to 13B4 and 13C1 to 13C4 graphically show the various aberrations of the zoom lenses of the numerical examples 1 to 6, respectively. In these graphs, the figure numbers with A, B or C show these aberrations in the wide-angle end, a middle focal length position or the telephoto end, respectively. The aberration curves are labeled 'd' for the spectral d-line (the wavelength: 587 nm), 'g' for the spectral g-line (the wavelength: 436 nm), 'ΔS' for the sagittal image surface, or 'ΔM' for the meridional image surface.

Referring to FIG. 1, the basic configuration of the zoom lens of the invention is first described. Reference numeral 1 denotes a first lens unit of positive refractive power, reference numeral 2 denotes a second lens unit of negative refractive power, reference numeral 3 denotes a third lens unit of positive refractive power, and reference numeral 4 denotes a fourth lens unit of positive refractive power. An aperture stop 5 is disposed in front of the third lens unit 3.

During zooming from the wide-angle end to the telephoto end, as shown by the arrows in FIG. 1, the second lens unit 2 axially moves toward the image side monotonously and, at the same time, the fourth lens unit 4 axially moves while depicting a locus convex toward the object side so as to compensate for the shift of an image plane with variation of the focal length. Incidentally, the first lens unit 1 and the third lens unit 3 remain stationary during zooming.

It should be pointed out here that, for the zoom lens of the invention, particularly, the fourth lens unit 4 is composed of not less than four lenses in total including at least one negative lens. This leads to achieve maintenance of the good optical performance throughout the entire zooming range. More specifically, on each side of a bi-concave lens in the fourth lens unit 4 there is disposed a positive lens. The fourth lens unit 4 is thus constructed in a form including a triplet.

With such a configuration and such a form in use, the zoom lens of the invention is corrected well for all the aberrations the fourth lens unit produces throughout the entire zooming range. Particularly for the on-axial and off-axial aberrations, it is easy to take balance in correction. So, the spherical aberration and the curvature of field can be corrected well at once. Therefore, a good optical performance can be obtained in the entire area of the image circle.

Also, the zoom lens in the present embodiment performs focusing by moving the fourth lens unit 4 axially. Particularly, because the fourth lens unit 4 is made up as a modified form of the triplet, the variation of aberrations with focusing can be suppressed to a minimum, thereby making it possible to shorten the minimum object distance. Particularly, in the telephoto positions where the total focusing movement is large, there is a merit that the effect of reducing the variation of the aberrations with focusing is prominent. In telephoto macro photography, therefore, the optical performance can be improved.

Another feature of the invention is that this triplet is either preceded or followed by a positive lens. Accordingly, the produced amounts of spherical aberration, off-axial coma and other aberrations are reduced.

Specific examples of such construction are described as follows. The fourth lens unit 4 comprises, in order from an object side to an image side, a positive lens having a strong convex surface facing the object side, a bi-concave lens, a positive lens having a strong convex surface facing the image side, and a positive lens having a strong convex surface facing the object side. With this construction, despite the use of a necessary minimum number of lenses constituting the fourth lens unit, it is possible to maintain good stability of optical performance. Since, in this example, two of the positive lenses take their places at the rear, the exit pupil is brought farther away from the image plane, giving a merit that it is possible to avert the influence of the shading on the solid-state image pickup element which results from the entrance of oblique rays.

As another example, the fourth lens unit 4 comprises, in order from an object side to an image side, a positive lens having a strong convex surface facing the object side, a positive lens having a strong convex surface facing the object side, a bi-concave lens and a positive lens having a strong convex surface facing the image side. Even with this construction too, despite the use of a necessary minimum number of lenses constituting the fourth lens unit, it is possible to maintain good stability of optical performance. In this example, the effective diameter for the light beam of the rearmost lens can be made relatively small in order to facilitate reduction of the size and weight of the fourth lens unit 4, giving a merit that an actuator of weaker driving torque suffices for moving the fourth lens unit as the focusing lens.

Further, the negative lens included in the fourth lens unit 4 may be cemented together with the positive lens on the object side thereof. In the case of the broken contact type, the axial misalignment sensitivity of the surfaces constituting an air lens between the positive lens and the negative lens tends to increase. If the positive lens and the negative lens are cemented together, therefore, an advantage is produced that the deterioration of the performance due to the misalignment tolerance can be lowered.

As a specific example of such a form, the fourth lens unit 4 comprises, in order from an object side to an image side, a meniscus cemented lens composed of a bi-convex lens and a bi-concave lens, a positive lens having a strong convex surface facing the image side and a positive lens having a strong convex surface facing the object side. This is favorable for good stability of optical performance with the limitation of the necessary number of lenses constituting the fourth lens unit to a minimum.

It should be noted that either of the positive lenses in the fourth lens unit may be formed as a cemented lens composed of a positive lens and a negative lens. If so, needless to say, it is possible to reduce the residual chromatic aberrations, both of the on-axial and off-axial ones, so that a zoom lens of higher resolution can be provided.

Another feature of the zoom lens of the invention is that the third lens unit 3 is composed of one positive lens alone. What the third lens unit 3 suffices for is only to have such a refractive power as to convert the diverging light beam from the second lens unit 2 into an afocal or converting light beam. In the point of view of minimizing the size of the entire lens system, it is preferred to limit the number of lenses to one. Incidentally, in each numerical example, the positive lens constituting the third lens unit 3 is a spherical lens. However, in the case of decreasing the F-number, the introduction of an aspheric surface is advantageous for correcting spherical aberration.

Further, the present embodiment makes determination of the design parameters so as to satisfy at least one of the following conditions (1) to (7). By this, the requirements of minimizing the bulk and size of the entire lens system and of maintaining good stability of optical performance throughout the entire zooming range are fulfilled at once, thus obtaining a compact zoom lens of good optical performance.

To express specifically, where the refractive index and Abbe number of the third lens unit 3 are denoted by N3 and ν3, respectively, the focal length of the negative lens of the fourth lens unit 4 is denoted by f4n, and the focal length of the fourth lens unit 4 is denoted by f4, the following conditions are satisfied:

$$1.55 < N3 < 1.90 \qquad (1)$$

$$40.0 < \nu 3 < 65.0 \qquad (2)$$

$$0.2 < |f4n|/f4 < 0.7 \qquad (3).$$

In the meantime, concerning the second lens unit 2, where the lateral magnifications in the wide-angle end and the telephoto end of the second lens unit 2 are denoted by b2w and b2t, respectively, and the focal lengths in the wide-angle end and the telephoto end of the entire zoom lens are denoted by fw and ft, respectively, the following condition is satisfied:

$$0.5 < (b2t/b2w)/(ft/fw) < 0.9 \qquad (4).$$

Also, where the focal length of the first lens unit 1 is denoted by f1, the focal length of the second lens unit 2 is denoted by f2, and the focal length of the third lens unit 3 is denoted by f3, the following conditions are satisfied:

$$0.1 < |f2|/f1 < 0.4 \qquad (5)$$

$$2.0 < f3/(fw \cdot ft)^{-1/2} < 6.0 \qquad (6)$$

$$1.0 < f4/(fw \cdot ft)^{-1/2} < 2.0 \qquad (7).$$

When each of the above conditions is satisfied, the above-described effects can be obtained independently of each other. However, more advantageously, it is preferable to satisfy two or more of the conditions simultaneously. In particular, the conditions (1) to (3) or the conditions (5) to (7) are preferably satisfied at once. In this respect, the most preferable recommendation is to satisfy all the conditions at once as is needless to explain.

The technical significance of each of the above-described conditions is next explained below.

The inequalities of condition (1) give a range for the refractive index of the positive lens of the third lens unit 3. When either of the upper and lower limits is exceeded, as this implies that the Petzval sum takes too large an absolute value, the curvature of field and astigmatism are under-corrected objectionably.

The inequalities of condition (2) give a range for the Abbe number of the positive lens of the third lens unit 3. When either the upper limit or the lower limit is exceeded, it becomes difficult in both cases to take good balance between the longitudinal and lateral chromatic aberrations. Particularly for an object of high spatial frequency, the resolution is to be improved. For this purpose, the chromatic aberrations must be corrected well enough. To obtain a zoom lens of high resolution, the condition (2) is of great importance.

The inequalities of condition (3) give a range for the refractive power of the negative lens (in the present embodiment, the bi-concave lens) of the fourth lens unit 4. When the upper limit is exceeded, the Petzval sum increases in the positive direction, producing field curvature as under-corrected objectionably. Also, another problem arises in that the back focal distance becomes too short for a group of filters to occupy. Also, the exit pupil can hardly be put at a sufficient distance from the image plane. When the lower limit is exceeded, the spherical aberration worsens as over-corrected throughout the entire zooming range. Also, under-correction of the off-axial coma results, and the back focal distance becomes too long, making it difficult to improve the compact form. Thus, these and other problems are produced.

The inequalities of condition (4) are concerned with the ratio of the lateral magnifications for the wide-angle and telephoto ends of the second lens unit 2 in terms of the ratio of the focal lengths in the wide-angle and telephoto ends of the entire zoom lens, and give a range for the rate of contribution of the variation of magnification of the second lens unit 2 to the zoom ratio. When the upper limit is exceeded, the variation with zooming of the aberrations the first lens unit 1 produces becomes difficult to correct sufficiently by the second lens unit 2. Particularly, the variation amounts of longitudinal and lateral chromatic aberrations become difficult to correct at once. As the range of variation of the magnification of the second lens unit 2 determined by the condition (4) does not reach unity, this insufficiency is compensated for by the action of varying the magnification of the composite system of the third lens unit 3 and the fourth lens unit 4. Therefore, when the lower limit is exceeded, the action of varying the magnification by the composite system of the third lens unit 3 and the fourth lens unit 4 is caused to strengthen. This causes the distance the fourth lens unit 4 moves with zooming to increase, which in turn causes increase of the difficulty of improving the compact form.

The inequalities of condition (5) give a range for the ratio of the focal lengths of the first lens unit 1 and the second lens unit 2. When the upper limit is exceeded, as this means that the absolute value of the focal length of the second lens unit 2 is too large as compared with the focal length of the first lens unit 1, the distance the second lens unit 2 moves becomes longer. In turn, the distance between the first lens unit 1 and the aperture stop becomes longer, causing the effective diameter of the first lens unit 1 to increase objectionably. When the lower limit is exceeded, as this means that the absolute value of the focal length of the second lens unit 2 is too small as compared with the focal length of the first lens unit 1, it becomes difficult to correct all the aberrations the second lens unit 2 produces. Particularly, the variation amounts of longitudinal and lateral chromatic aberrations caused by zooming become difficult to correct at once, producing a problem of lowering the resolution of a high frequency component in spatial frequency.

The inequalities of condition (6) give a range for the focal length of the third lens unit 3. When the upper limit is exceeded, as this means that the refractive power of the third lens unit 3 is too weak, the axial beam diverges, entering the fourth lens unit 4. So, the outer diameter of the fourth lens unit 4 is caused to increase objectionably. Also, the positive lens on the object side of the bi-concave lens in the fourth lens unit 4 has to take a stronger convergence, causing especially the spherical aberration to be under-corrected objectionably. When the refractive power of the third lens unit 3 is too strong as exceeding the lower limit, the predetermined back focal distance and the required space for the zooming range between the third lens unit 3 and the fourth lens unit 4 cannot be obtained.

The inequalities of condition (7) give a range for the focal length of the fourth lens unit 4. When the upper limit is exceeded, as this means that the refractive power of the fourth lens unit 4 is too weak, the focusing movement increases greatly. This is not favorable in the points of the consumption of electric energy and the response speed at the time of focusing.

When the refractive power of the fourth lens unit 4 is too strong beyond the lower limit, it becomes impossible to obtain a back focal distance long enough to insert a group of filters thereto.

Next, numerical examples 1 to 6 of the invention are shown. In the numerical data for the examples 1 to 6, Ri is the radius of curvature of the i-th surface when counted from the object side, Di is the i-th axial lens thickness or air separation when counted from the object side, and Ni and vi are respectively the refractive index and Abbe number of the glass material of the i-th lens element when counted from the object side.

The values of the factors in the conditions (1) to (7) for the numerical examples 1 to 6 are listed in Table-1 below.

TABLE 1

| Condition No. | Numerical Example | | | | | |
|---|---|---|---|---|---|---|
| | 1 | 2 | 3 | 4 | 5 | 6 |
| (1) | 1.74 | 1.83 | 1.64 | 1.74 | 1.80 | 1.74 |
| (2) | 49.3 | 42.7 | 60.1 | 49.3 | 42.2 | 44.8 |
| (3) | 0.50 | 0.49 | 0.48 | 0.51 | 0.35 | 0.54 |
| (4) | 0.70 | 0.65 | 0.76 | 0.64 | 0.79 | 0.72 |
| (5) | 0.23 | 0.25 | 0.25 | 0.23 | 0.26 | 0.23 |
| (6) | 3.38 | 3.06 | 2.70 | 5.20 | 2.82 | 2.47 |
| (7) | 1.36 | 1.51 | 1.60 | 1.27 | 1.32 | 1.49 |

Numerical Example 1 f = 1 – 2.91   Fno = 2.50 – 2.64   2ω = 61.6° – 23.2°

| R1 = | 8.953 | D1 = 0.24 | N1 = 1.846660 | v1 = 23.8 |
|---|---|---|---|---|
| R2 = | 5.578 | D2 = 0.78 | N2 = 1.603112 | v2 = 60.7 |
| R3 = | –104.382 | D3 = 0.04 | | |
| R4 = | 4.326 | D4 = 0.48 | N3 = 1.696797 | v3 = 55.5 |
| R5 = | 9.404 | D5 = Variable | | |
| R6 = | 5.786 | D6 = 0.15 | N4 = 1.804000 | v4 = 46.6 |
| R7 = | 1.573 | D7 = 0.47 | | |
| R8 = | –16.219 | D8 = 0.13 | N5 = 1.772499 | v5 = 49.6 |
| R9 = | 1.399 | D9 = 0.20 | | |
| R10 = | 1.698 | D10 = 0.39 | N6 = 1.846660 | v6 = 23.8 |
| R11 = | 4.827 | D11 = Variable | | |
| R12 = Stop | | D12 = 0.26 | | |
| R13 = | 81.118 | D13 = 0.19 | N7 = 1.743198 | v7 = 49.3 |
| R14 = | –4.514 | D14 = Variable | | |
| R15 = | 1.345 | D15 = 0.47 | N8 = 1.804000 | v8 = 46.6 |
| R16 = | –366.584 | D16 = 0.07 | | |
| R17 = | –3.524 | D17 = 0.14 | N9 = 1.846660 | v9 = 23.8 |
| R18 = | 1.390 | D18 = 0.34 | | |
| R19 = | –4.888 | D19 = 0.30 | N10 = 1.696797 | v10 = 55.5 |
| R20 = | –1.760 | D20 = 0.04 | | |
| R21 = | 2.765 | D21 = 0.47 | N11 = 1.772499 | v11 = 49.6 |
| R22 = | –10.891 | D22 = Variable | | |
| R23 = ∞ | | D23 = 0.93 | N12 = 1.516330 | v12 = 64.2 |
| R24 = ∞ | | | | |

| Variable | Focal Length | | |
|---|---|---|---|
| Separation | 1.00 | 1.57 | 2.91 |
| D 5 | 0.19 | 1.22 | 2.34 |
| D11 | 2.68 | 1.65 | 0.53 |

| Variable | Focal Length | | |
|---|---|---|---|
| Separation | 1.00 | 1.57 | 2.91 |
| D14 | 0.77 | 0.62 | 0.44 |
| D22 | 0.43 | 0.58 | 0.76 |

Numerical Example 2 f = 1 – 3.00   Fno = 2.50 – 2.76   2ω = 65.2° – 24.1°

| R1 = | 61.318 | D1 = 0.20 | N1 = 1.761821 | v1 = 26.5 |
|---|---|---|---|---|
| R2 = | 4.094 | D2 = 0.12 | | |
| R3 = | 5.177 | D3 = 0.46 | N2 = 1.696797 | v2 = 55.5 |
| R4 = | 129.124 | D4 = 0.04 | | |
| R5 = | 3.922 | D5 = 0.50 | N3 = 1.882997 | v3 = 40.8 |
| R6 = | 28.300 | D6 = Variable | | |
| R7 = | 4.707 | D7 = 0.14 | N4 = 1.834807 | v4 = 42.7 |
| R8 = | 0.992 | D8 = 0.42 | | |
| R9 = | –5.057 | D9 = 0.14 | N5 = 1.603112 | v5 = 60.7 |
| R10 = | 2.278 | D10 = 0.04 | | |
| R11 = | 1.676 | D11 = 0.36 | N6 = 1.846659 | v6 = 23.8 |
| R12 = | 6.625 | D12 = Variable | | |
| R13 = Stop | | D13 = 0.24 | | |
| R14 = | 26.002 | D14 = 0.24 | N7 = 1.834807 | v7 = 42.7 |
| R15 = | –5.311 | D15 = Variable | | |
| R16 = | 1.580 | D16 = 0.42 | N8 = 1.772499 | v8 = 49.6 |
| R17 = | –19.908 | D17 = 0.12 | | |
| R18 = | –4.156 | D18 = 0.40 | N9 = 1.846659 | v9 = 23.8 |
| R19 = | 1.549 | D19 = 0.20 | | |
| R20 = | 117.585 | D20 = 0.36 | N10 = 1.696797 | v10 = 55.5 |
| R21 = | –2.569 | D21 = 0.04 | | |
| R22 = | 2.658 | D22 = 0.40 | N11 = 1.603112 | v11 = 60.7 |
| R23 = | –8.135 | D23 = Variable | | |
| R24 = ∞ | | D24 = 1.00 | N12 = 1.516330 | v12 = 64.2 |
| R25 = ∞ | | | | |

| Variable | Focal Length | | |
|---|---|---|---|
| Separation | 1.00 | 1.59 | 3.00 |
| D 6 | 0.12 | 1.15 | 2.26 |
| D12 | 2.54 | 1.51 | 0.40 |
| D15 | 0.91 | 0.69 | 0.40 |
| D23 | 0.20 | 0.41 | 0.71 |

Numerical Example 3 f = 1 – 2.53   Fno = 2.50 – 2.73   2ω = 59.8° – 25.6°

| R1 = | 12.838 | D1 = 0.25 | N1 = 1.846659 | v1 = 23.8 |
|---|---|---|---|---|
| R2 = | 4.823 | D2 = 0.67 | N2 = 1.620410 | v2 = 60.3 |
| R3 = | –23.308 | D3 = 0.04 | | |
| R4 = | 2.924 | D4 = 0.50 | N3 = 1.772499 | v3 = 49.6 |
| R5 = | 7.275 | D5 = Variable | | |
| R6 = | 5.758 | D6 = 0.14 | N4 = 1.834807 | v4 = 42.7 |
| R7 = | 1.055 | D7 = 0.61 | | |
| R8 = | –1.852 | D8 = 0.13 | N5 = 1.772499 | v5 = 49.6 |
| R9 = | 2.183 | D9 = 0.40 | N6 = 1.846659 | v6 = 23.8 |
| R10 = | –4.664 | D10 = Variable | | |
| R11 = Stop | | D11 = 0.36 | | |
| R12 = | 5.225 | D12 = 0.22 | N7 = 1.639999 | v7 = 60.1 |
| R13 = | –5.730 | D13 = Variable | | |
| R14 = | 1.504 | D14 = 0.43 | N8 = 1.772499 | v8 = 49.6 |
| R15 = | –12.639 | D15 = 0.09 | | |
| R16 = | –4.382 | D16 = 0.36 | N9 = 1.805181 | v9 = 25.4 |
| R17 = | 1.305 | D17 = 0.14 | | |
| R18 = | 10.118 | D18 = 0.36 | N10 = 1.696797 | v10 = 55.5 |

-continued

Numerical Example 3

| | | | |
|---|---|---|---|
| R19 = −2.767 | D19 = 0.04 | | |
| R20 = 2.257 | D20 = 0.32 | N11 = 1.563839 | ν11 = 60.7 |
| R21 = −36.635 | D21 = Variable | | |
| R22 = ∞ | D22 = 0.90 | N12 = 1.516330 | ν12 = 64.2 |
| R23 = ∞ | | | |

| Variable | Focal Length | | |
|---|---|---|---|
| Separation | 1.00 | 1.50 | 2.53 |
| D 5 | 0.11 | 0.76 | 1.47 |
| D10 | 1.96 | 1.30 | 0.60 |
| D13 | 0.59 | 0.44 | 0.29 |
| D21 | 0.18 | 0.33 | 0.48 |

Numerical Example 4 f = 1 − 3.67   Fno = 2.50 − 2.93   2ω = 62.3° − 18.7°

| | | | |
|---|---|---|---|
| R1 = 9.314 | D1 = 0.25 | N1 = 1.846659 | ν1 = 23.8 |
| R2 = 4.736 | D2 = 0.79 | N2 = 1.589130 | ν2 = 61.2 |
| R3 = −79.186 | D3 = 0.04 | | |
| R4 = 3.834 | D4 = 0.49 | N3 = 1.794997 | ν3 = 45.3 |
| R5 = 7.095 | D5 = Variable | | |
| R6 = 9.177 | D6 = 0.15 | N4 = 1.834807 | ν4 = 42.7 |
| R7 = 1.266 | D7 = 0.48 | | |
| R8 = −28.327 | D8 = 0.13 | N5 = 1.788001 | ν5 = 47.4 |
| R9 = 1.918 | D9 = 0.21 | | |
| R10 = 2.054 | D10 = 0.40 | N6 = 1.846659 | ν6 = 23.8 |
| R11 = 11.141 | D11 = Variable | | |
| R12 = Stop | D12 = 0.26 | | |
| R13 = ∞ | D13 = 0.19 | N7 = 1.743198 | ν7 = 49.3 |
| R14 = −7.397 | D14 = Variable | | |
| R15 = 2.635 | D15 = 0.38 | N8 = 1.725999 | ν8 = 53.6 |
| R16 = −80.984 | D16 = 0.04 | | |
| R17 = 1.536 | D17 = 0.30 | N9 = 1.696800 | ν9 = 56.5 |
| R18 = 8.646 | D18 = 0.15 | | |
| R19 = −10.837 | D19 = 0.34 | N10 = 1.846659 | ν10 = 23.8 |
| R20 = 1.186 | D20 = 0.19 | | |
| R21 = 4.069 | D21 = 0.38 | N11 = 1.772499 | ν11 = 49.6 |
| R22 = −2.730 | D22 = Variable | | |
| R23 = ∞ | D23 = 0.94 | N12 = 1.516330 | ν12 = 64.2 |
| R24 = ∞ | | | |

| Variable | Focal Length | | |
|---|---|---|---|
| Separation | 1.00 | 1.72 | 3.67 |
| D 5 | 0.19 | 1.39 | 2.70 |
| D11 | 3.08 | 1.87 | 0.57 |
| D14 | 0.65 | 0.45 | 0.20 |
| D22 | 0.33 | 0.53 | 0.78 |

Numerical Example 5 f = 1 − 3.00   Fno = 2.50 − 2.54   2ω = 62.2° − 22.8°

| | | | |
|---|---|---|---|
| R1 = 13.671 | D1 = 0.25 | N1 = 1.846659 | ν1 = 23.8 |
| R2 = 6.210 | D2 = 0.79 | N2 = 1.670000 | ν2 = 57.3 |
| R3 = −45.835 | D3 = 0.04 | | |
| R4 = 4.315 | D4 = 0.49 | N3 = 1.740999 | ν3 = 52.6 |
| R5 = 10.011 | D5 = Variable | | |

-continued

Numerical Example 5

| | | | |
|---|---|---|---|
| R6 = 13.857 | D6 = 0.15 | N4 = 1.786500 | ν4 = 50.0 |
| R7 = 1.574 | D7 = 0.48 | | |
| R8 = −23.814 | D8 = 0.13 | N5 = 1.725999 | ν5 = 53.6 |
| R9 = 1.875 | D9 = 0.21 | | |
| R10 = 2.103 | D10 = 0.40 | N6 = 1.846659 | ν6 = 23.8 |
| R11 = 6.902 | D11 = Variable | | |
| R12 = Stop | D12 = 0.26 | | |
| R13 = 13.555 | D13 = 0.19 | N7 = 1.799516 | ν7 = 42.2 |
| R14 = −5.441 | D14 = Variable | | |
| R15 = 1.623 | D15 = 0.47 | N8 = 1.800999 | ν8 = 35.0 |
| R16 = −1.349 | D16 = 0.14 | N9 = 1.846659 | ν9 = 23.8 |
| R17 = 1.433 | D17 = 0.40 | | |
| R18 = 9.869 | D18 = 0.30 | N10 = 1.754998 | ν10 = 52.3 |
| R19 = −4.317 | D19 = 0.04 | | |
| R20 = 2.344 | D20 = 0.38 | N11 = 1.785896 | ν11 = 44.2 |
| R21 = 24.552 | D21 = Variable | | |
| R22 = ∞ | D22 = 0.94 | N12 = 1.516330 | ν12 = 64.2 |
| R23 = ∞ | | | |

| Variable | Focal Length | | |
|---|---|---|---|
| Separation | 1.00 | 1.60 | 3.00 |
| D 5 | 0.19 | 1.32 | 2.55 |
| D11 | 2.73 | 1.60 | 0.38 |
| D14 | 1.01 | 0.89 | 0.81 |
| D21 | 0.19 | 0.30 | 0.38 |

Numerical Example 6 f = 1 − 3.00   Fno = 2.50 − 2.60   2ω = 62.2° − 22.8°

| | | | |
|---|---|---|---|
| R1 = 9.421 | D1 = 0.25 | N1 = 1.846660 | ν1 = 23.8 |
| R2 = 5.249 | D2 = 0.79 | N2 = 1.603112 | ν2 = 60.7 |
| R3 = −66.858 | D3 = 0.04 | | |
| R4 = 3.791 | D4 = 0.49 | N3 = 1.696797 | ν3 = 55.5 |
| R5 = 7.960 | D5 = Variable | | |
| R6 = 8.499 | D6 = 0.15 | N4 = 1.804000 | ν4 = 46.6 |
| R7 = 1.320 | D7 = 0.48 | | |
| R8 = −31.166 | D8 = 0.13 | N5 = 1.772499 | ν5 = 49.6 |
| R9 = 1.658 | D9 = 0.21 | | |
| R10 = 1.855 | D10 = 0.40 | N6 = 1.846660 | ν6 = 23.8 |
| R11 = 6.458 | D11 = Variable | | |
| R12 = Stop | D12 = 0.26 | | |
| R13 = 6.286 | D13 = 0.19 | N7 = 1.743997 | ν7 = 44.8 |
| R14 = −6.357 | D14 = Variable | | |
| R15 = 1.488 | D15 = 0.47 | N8 = 1.804000 | ν8 = 46.6 |
| R16 = 5.276 | D16 = 0.07 | | |
| R17 = −4.519 | D17 = 0.14 | N9 = 1.846660 | ν9 = 23.8 |
| R18 = 1.626 | D18 = 0.34 | | |
| R19 = −11.508 | D19 = 0.30 | N10 = 1.719995 | ν10 = 50.3 |
| R20 = −2.060 | D20 = 0.04 | | |
| R21 = 3.171 | D21 = 0.45 | N11 = 1.725999 | ν11 = 53.6 |
| R22 = −2.801 | D22 = 0.13 | N12 = 1.761821 | ν12 = 26.5 |
| R23 = −6.405 | D23 = Variable | | |
| R24 = ∞ | D24 = 0.94 | N13 = 1.516330 | ν13 = 64.2 |
| R25 = ∞ | | | |

| Variable | Focal Length | | |
|---|---|---|---|
| Separation | 1.00 | 1.59 | 3.00 |
| D 5 | 0.19 | 1.24 | 2.39 |
| D11 | 2.75 | 1.70 | 0.55 |

-continued

| Variable | Focal Length | | |
|---|---|---|---|
| Separation | 1.00 | 1.59 | 3.00 |
| D14 | 0.72 | 0.55 | 0.37 |
| D23 | 0.19 | 0.36 | 0.54 |

In the numerical examples 1 to 3, the fourth lens unit 4 comprises, in order from the object side to the image side, a positive lens having a strong convex surface facing the object side, a bi-concave lens, a positive lens having a strong convex surface facing the image side and a positive lens having a strong convex surface facing the object side.

In the numerical example 4, the fourth lens unit 4 comprises, in order from the object side to the image side, a positive lens having a strong convex surface facing the object side, a positive lens having a strong convex surface facing the object side, a bi-concave lens and a positive lens having a strong convex surface facing the image side.

In the numerical example 5, the fourth lens unit 4 comprises, in order from the object side to the image side, a meniscus cemented lens composed of a bi-convex lens and a bi-concave lens, a positive lens having a strong convex surface facing the image side and a positive lens having a strong convex surface facing the object side.

In the numerical example 6, the fourth lens unit 4 comprises, in order from the object side to the image side, a positive lens having a strong convex surface facing the object side, a bi-concave lens, a positive lens having a strong convex surface facing the image side and a positive cemented lens composed of a bi-convex lens and a negative meniscus lens.

Incidentally, the term "strong convex surface facing the object side" used in the specification means that the surface on the object side is stronger in convexity than the surface on the image side. Conversely, the term "strong convex surface facing the image side" means that the surface on the image side is stronger in convexity than the surface on the object side.

With the form and construction of the constituent lenses arranged as described above, when the field angle for the wide-angle end is increased to 60° or wider, a good optical performance is maintained stable throughout the entire zooming range, thus producing an advantage of providing a zoom lens of higher resolution.

Thus, the zoom lens of the invention is applicable as a photographic optical system to the digital camera.

Figure 14:
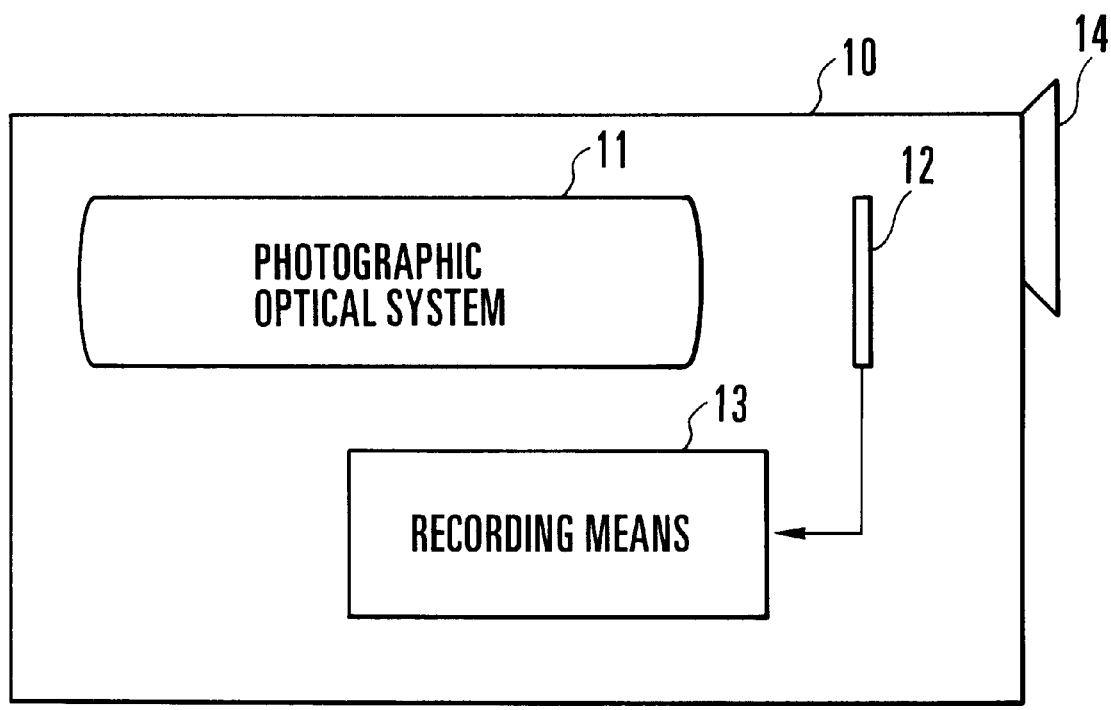
FIG. 14 is a schematic diagram of the construction of a digital camera using the zoom lens of the invention.

Referring to FIG. 14, a digital camera body 10 contains a photographic optical system 11 which is constituted by the zoom lens of the invention. The photographic optical system 11 forms an image of an object on an image sensor 12 such as CCD. The output of the image sensor 12 which represents the object image is recorded by a recording means 13. The object image is observed at a viewfinder 14. The viewfinder 14 may be either of the optical view type or another type which uses a display device such as liquid crystal panel in combination with an eyepiece lens.

When the zoom lens of the invention is applied to an optical apparatus such as a digital camera, it is possible to realize an optical apparatus of compact form with a high optical performance.

What is claimed is:

1. A zoom lens comprising, in order from an object side to an image side:

a first lens unit of positive refractive power;

a second lens unit of negative refractive power;

a third lens unit of positive refractive power, said third lens unit consisting of a single lens; and a fourth lens unit of positive refractive power, said fourth lens unit comprising not less than four lenses including at least one negative lens, wherein, during zooming, said first lens unit and said third lens unit remain stationary and said second lens unit and said fourth lens unit move along an optical axis.

2. A zoom lens according to claim 1, wherein said fourth lens unit consists of one negative lens and three positive lens.

3. A zoom lens according to claim 2, wherein said fourth lens unit consists of, in order from the object side to the image side:

a positive first lens;

a negative second lens;

a positive third lens; and a positive fourth lens.

4. A zoom lens according to claim 3, wherein said positive first lens is a lens having a strong convex surface facing the object side, said negative second lens is a bi-concave lens, said positive third lens is a lens having a strong convex surface facing the image side, and said positive fourth lens is a lens having a strong convex surface facing the object side.

5. A zoom lens according to claim 3, wherein said positive first lens and said negative second lens of said fourth lens unit are cemented together to constitute a cemented lens.

6. A zoom lens according to claim 5, wherein said positive first lens is a bi-convex lens, said negative second lens is a bi-concave lens, said positive third lens is a lens having a strong convex surface facing the image side, and said positive fourth lens is a lens having a strong convex surface facing the object side.

7. A zoom lens according to claim 2, wherein said fourth lens unit consists of, in order from the object side to the image side:

a positive first lens;

a positive second lens;

a negative third lens; and a positive fourth lens.

8. A zoom lens according to claim 7, wherein said positive first lens is a lens having a strong convex surface facing the object side, said positive second lens is a lens having a strong convex surface facing the object side, said negative third lens is a bi-concave lens, and said positive fourth lens is a lens having a strong convex surface facing the image side.

9. A zoom lens according to claim 2, wherein at least one of said three positive lenses of said fourth lens unit is a cemented lens consisting of a positive lens and a negative lens.

10. A zoom lens according to claim 1, satisfying the following conditions:

$$1.55 < N3 < 1.90$$

$$40.0 < v3 < 65.0$$

$$0.2 < |f4n|/f4 < 0.7$$

where N3 and ν3 are a refractive index and an Abbe number of said third lens unit, respectively, f4n is a focal length of said negative lens of said fourth lens unit, and f4 is a focal length of said fourth lens unit.

11. A zoom lens according to claim 1, satisfying the following condition:

$$0.5<(b2t/b2w)/(ft/fw)<0.9$$

where b2w and b2t are lateral magnifications in a wide-angle end and a telephoto end of said second lens unit, respectively, and fw and ft are focal lengths in the wide-angle end and the telephoto end of said zoom lens, respectively.

12. A zoom lens according to claim 1, satisfying the following conditions:

$$0.1<|f2|/f1<0.4$$

$$2.0<f3/(fw \cdot ft)^{-1/2}<6.0$$

$$1.0<f4/(fw \cdot ft)^{-1/2}<2.0$$

where f1, f2 and f3 are focal lengths of said first lens unit, said second lens unit and said third lens unit, respectively, and fw and ft are focal lengths in a wide-angle end and a telephoto end of said zoom lens, respectively.

13. An optical apparatus comprising:
 a photographic lens, said photographic lens being said zoom lens according to one of claims 1 to 12; and
 an image sensor, an image of an object being formed on said image sensor by said photographic lens.

* * * * *